United States Patent
Xu et al.

(10) Patent No.: US 12,284,685 B1
(45) Date of Patent: Apr. 22, 2025

(54) RANDOM ACCESS METHOD AND RANDOM ACCESS DEVICE

(71) Applicant: SHANGHAI SATELLITE NETWORK RESEARCH INSTITUTE CO., LTD., Shanghai (CN)

(72) Inventors: Xiaofan Xu, Shanghai (CN); Yueyue Zhang, Shanghai (CN); Jianfei Tong, Shanghai (CN); Hong Yan, Shanghai (CN)

(73) Assignee: SHANGHAI SATELLITE NETWORK RESEARCH INSTITUTE CO., LTD., Shanghai (CN)

( * ) Notice: Subject to any disclaimer, the term of this patent is extended or adjusted under 35 U.S.C. 154(b) by 0 days.

(21) Appl. No.: 18/932,249

(22) Filed: Oct. 30, 2024

Related U.S. Application Data

(63) Continuation of application No. PCT/CN2023/132041, filed on Nov. 16, 2023.

(51) Int. Cl.
  *H04W 4/00* (2018.01)
  *H04W 64/00* (2009.01)
  *H04W 74/0833* (2024.01)

(52) U.S. Cl.
  CPC ..... *H04W 74/0833* (2013.01); *H04W 64/003* (2013.01)

(58) Field of Classification Search
  CPC ............ H04W 74/0833; H04W 64/003
  See application file for complete search history.

(56) References Cited

U.S. PATENT DOCUMENTS

| | | | | |
|---|---|---|---|---|
| 2019/0274169 | A1* | 9/2019 | Tsai | H04W 56/003 |
| 2021/0006328 | A1* | 1/2021 | Kim | H04W 72/23 |
| 2023/0056778 | A1 | 2/2023 | Lin | |
| 2023/0284264 | A1* | 9/2023 | Kim | H04W 74/006 370/329 |

(Continued)

FOREIGN PATENT DOCUMENTS

| | | | | |
|---|---|---|---|---|
| CA | 3112266 | A1 * | 3/2020 | H04B 7/18539 |
| CN | 112584538 | A | 3/2021 | |
| CN | 115665883 | A | 1/2023 | |

(Continued)

*Primary Examiner* — Thai Dinh Hoang
(74) *Attorney, Agent, or Firm* — IPro, PLLC

(57) ABSTRACT

Embodiments of the present disclosure disclose a random access method and a random access device, and relate to the field of communication technology. The method includes: first random access message is sent to a network device by a spatial terminal, where the first random access message carries a first preamble sequence, the first preamble sequence is generated based on a target mask, and the target mask is associated with a height where the spatial terminal is located; and a response message from the network device is received. In this way, the spatial terminal may initiate the random access using the first preamble sequence associated with the height where the spatial terminal is located, thereby avoiding collision and conflict with preamble sequences used by the spatial terminals at other heights, improving success rate of random access of the spatial terminal, and further improving efficiency of the random access.

19 Claims, 9 Drawing Sheets

---

401 Sending the first random access message to the network device, where the first random access message carries the first preamble sequence, the first preamble sequence is generated based on the target mask, and the target mask is associated with the height where the spatial terminal is located 402 Receiving the response message from the network device

(56) References Cited

U.S. PATENT DOCUMENTS

2024/0032020 A1* 1/2024 Kim .................. H04W 72/542

FOREIGN PATENT DOCUMENTS

| | | | | |
|---|---|---|---|---|
| CN | 115942506 A | | 4/2023 | |
| CN | 116054916 A | * | 5/2023 | ........... H04B 7/1853 |
| CN | 116965140 A | | 10/2023 | |
| WO | WO-2007089296 A2 | * | 8/2007 | ........... H04B 17/382 |
| WO | WO-2019192469 A1 | * | 10/2019 | ........... H04B 7/0626 |
| WO | 2022079692 A1 | | 4/2022 | |
| WO | WO-2023000899 A1 | * | 1/2023 | |
| WO | WO-2023071843 A1 | * | 5/2023 | |
| WO | WO-2023138624 A1 | * | 7/2023 | ........... H04L 5/0051 |
| WO | 2023210549 A1 | | 11/2023 | |
| WO | WO-2023217007 A1 | * | 11/2023 | |

* cited by examiner

RANDOM ACCESS METHOD AND RANDOM ACCESS DEVICE

CROSS-REFERENCE TO RELATED APPLICATIONS

This application is a continuation application of International Application No. PCT/CN2023/132041 filed on Nov. 16, 2023, the entire contents of which are incorporated herein by reference.

TECHNICAL FIELD

The present disclosure relates to the field of communication technology, and particularly to a random access method and a random access device.

BACKGROUND

In a communication system, a random access process is configured for multiple scenarios, such as an initial system access, transition from an idle mode to an active mode, a handover, and a request of a radio resource control (RRC) during synchronous reallocation, and a main purpose of executing the random access process is uplink synchronization, including: synchronization, access, response and authorization of a terminal device and a network device are key links to determine whether the terminal device may successfully access the communication system and obtain communication services. Improving success rate of random access and thus improving efficiency of the random access is very important for the terminal device to obtain communication services in a timely manner.

SUMMARY

Embodiments of the present disclosure provide a random access method and a random access device, which may improve success rate of random access, thereby improving efficiency of the random access.

According to a first aspect of embodiments of the present disclosure, there is provided a random access method, including: sending a first random access message to a network device, where the first random access message carries a first preamble sequence, the first preamble sequence is generated based on a target mask, and the target mask is associated with a height where a spatial terminal is located; and receiving a response message from the network device.

In some embodiments, the first preamble sequence is obtained by multiplying a second preamble sequence and the target mask.

In some embodiments, masks corresponding to a first height and a second height are mutually orthogonal or mutually quasi-orthogonal.

In some embodiments, a same beam of the network device covers multiple stereo cells, of which a first stereo cell and a second stereo cell are located at different heights.

In some embodiments, the random access method further includes: sending absolute position information to the network device, where the absolute position information is configured to determine a stereo cell where the spatial terminal is located, and determine a mask corresponding to a height where the stereo cell is located as the target mask; and receiving the target mask sent by the network device.

In some embodiments, the random access method further includes: sending height information to the network device, where the height information is configured to determine the target mask; and receiving the target mask sent by the network device.

In some embodiments, the random access method further includes: obtaining the target mask from masks corresponding to various heights stored in advance in the spatial terminal.

In some embodiments, the response message includes a successfully accessed response message, the response message carries a time advance of uplink sending timing, and the time advance is obtained based on the first preamble sequence.

In some embodiments, the response message includes a back-off response message, the response message carries the time advance of the uplink sending timing, and the time advance is obtained based on the first preamble sequence; the method further includes: adjusting the uplink sending timing based on the time advance; sending a second random access message to the network device based on an adjusted uplink sending timing, where the second random access message carries a third preamble sequence, and the third preamble sequence is generated based on the target mask; and completing random access based on the second random access message.

According to a second aspect of embodiments of the present disclosure, there is provided the random access method, including: receiving the first random access message sent by the spatial terminal, where the first random access message carries the first preamble sequence, the first preamble sequence is generated based on the target mask, and the target mask is associated with the height where the spatial terminal is located; and returning the response message to the spatial terminal.

In some embodiments, the first preamble sequence is obtained by multiplying the second preamble sequence and the target mask.

In some embodiments, the masks corresponding to the first height and the second height are mutually orthogonal or mutually quasi-orthogonal.

In some embodiments, the same beam of the network device covers the multiple stereo cells, of which the first stereo cell and the second stereo cell are located at different heights.

In some embodiments, the random access method further includes: receiving the absolute position information sent by the spatial terminal, determining the stereo cell where the spatial terminal is located based on the absolute position information, determining the mask corresponding to the height where the stereo cell is located as the target mask; and sending the target mask to the spatial terminal.

In some embodiments, the random access method further includes: receiving the height information sent by the spatial terminal, determining the target mask based on the height information; and sending the target mask to the spatial terminal.

In some embodiments, the response message includes the successfully accessed response message, the response message carries the time advance of the uplink sending timing, and the time advance is obtained based on the first preamble sequence.

In some embodiments, the response message includes the back-off response message, the response message carries the time advance of the uplink sending timing, and the time advance is obtained based on the first preamble sequence; the method further includes: receiving the second random access message sent by the spatial terminal, where the second random access message is sent based on the adjusted uplink sending timing, the uplink sending timing is adjusted based on the time advance, the second random access message carries the third preamble sequence, and the third preamble sequence is generated based on the target mask; and completing the random access based on the second random access message.

According to a third aspect of embodiments of the present disclosure, there is provided the random access device, including: a transceiver module configured to send the first random access message to the network device, where the first random access message carries the first preamble sequence, the first preamble sequence is generated based on the target mask, and the target mask is associated with the height where the spatial terminal is located; and the transceiver module further configured to receive the response message from the network device.

According to a fourth aspect of embodiments of the present disclosure, there is provided the random access device, including: a transceiver module configured to receive the first random access message sent by the spatial terminal, where the first random access message carries the first preamble sequence, the first preamble sequence is generated based on the target mask, and the target mask is associated with the height where the spatial terminal is located; and the transceiver module further configured to return the response message to the spatial terminal.

According to a fifth aspect of embodiments of the present disclosure, there is provided the spatial terminal, including: one or more processors; and one or more memories for storing instructions; where the processor is configured to invoke the instructions to enable the spatial terminal to perform the random access method as described in the first aspect and the alternative implementation of the first aspect.

According to a sixth aspect of embodiments of the present disclosure, there is provided the network device, including: one or more processors; and one or more memories for storing the instructions; where the processor is configured to invoke the instructions to enable the spatial terminal to perform the random access method as described in the second aspect and the alternative implementation of the second aspect.

According to a seventh aspect of embodiments of the present disclosure, there is provided a communication system, including the spatial terminal and the network device, where the spatial terminal is configured to implement the random access method as described in the first aspect and the alternative implementation of the first aspect, and the network device is configured to implement the random access method as described in the second aspect and the alternative implementation of the second aspect.

According to an eighth aspect of embodiments of the present disclosure, there is provided a storage medium storing the instructions that, when executed on a communication device, enable the communication device to perform the random access method as described in the first aspect and the alternative implementation of the first aspect, or to perform the random access method as described in the second aspect and the alternative implementation of the second aspect.

According to a ninth aspect of embodiments of the present disclosure, there is provided a program product that, when executed by a communication device, enables the communication device to perform the random access method as described in the first aspect or the second aspect, the alternative implementation of the first aspect or the alternative implementation of the second aspect.

According to a tenth aspect of embodiments of the present disclosure, there is provided a computer program that, when run on a computer, enables the computer to perform the random access method as described in the first aspect or the second aspect, the alternative implementation of the first aspect or the alternative implementation of the second aspect.

With the solution proposed by embodiments of the present disclosure, the first random access message is sent to the network device by the spatial terminal, and the response message from the network device is received, where the first random access message carries the first preamble sequence, the first preamble sequence is generated based on the target mask, and the target mask is associated with the height where the spatial terminal is located, so that the spatial terminal may initiate the random access using the first preamble sequence associated with the height where the spatial terminal is located, thereby avoiding collision and conflict with preamble sequences used by the spatial terminals at other heights, improving the success rate of the random access of the spatial terminal, and further improving the efficiency of the random access.

BRIEF DESCRIPTION OF THE DRAWINGS

In order to more clearly illustrate the technical solutions in embodiments or the background art of the present disclosure, the drawings used in embodiments or the background art of the present disclosure will be described below.

DETAILED DESCRIPTION

Figure 1:
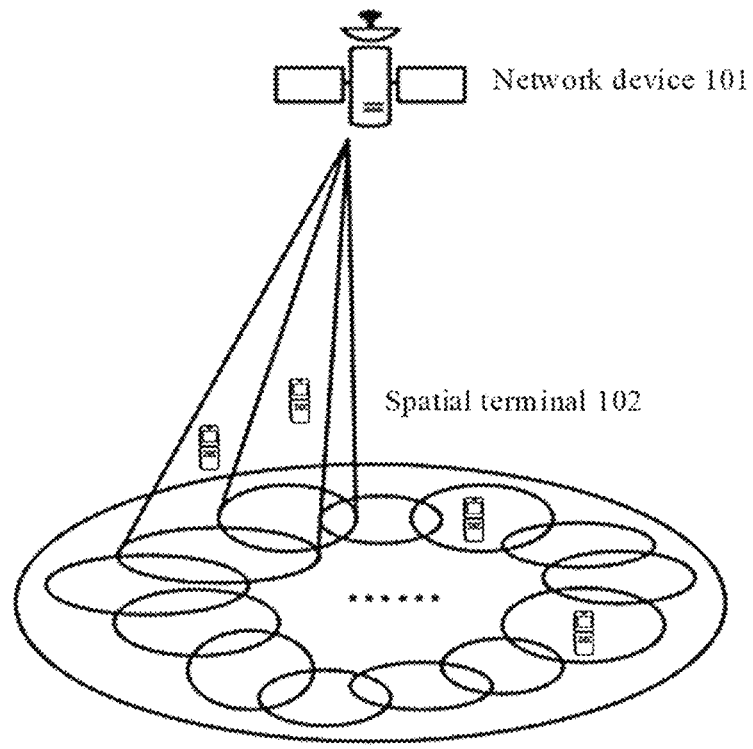
FIG. 1 is an architectural diagram illustrating a communication system according to embodiments of the present disclosure.

With development of global communication service scenarios and requirements, types and numbers of terminal devices at different heights, such as unmanned aerial vehicles (UAVs), high-altitude platforms and low-earth orbiting satellites, are increasing, and terminal devices in air has distribution with three-dimensional time-varying characteristics and non-uniform characteristics.

Taking a satellite communication system as an example, in order to meet service requirements of the terminal devices on ground, in ocean and in the air, the satellite communication system uses a design idea for dividing a mobile communication cellular network cell for reference, and adopts a frequency color separation multiplexing mode to form several spot beam cells in a two-dimensional plane, to realize seamless coverage of a ground surface service area. Moreover, a small number of staring beams are used to provide a limited access capability for a specific air terminal device. However, the use of staring beams increases consumption of beam resources, and the satellite communication system has problems of low utilization rate of the beam resources and inflexible scheduling of the beam resources, so that capacity of the communication system is difficult to improve.

In order to improve the utilization rate of the beam resources, flexibility scheduling of the beam resources and the capacity of the communication system, the same beam may be used to provide communication services for the terminal devices on the ground, in the ocean and in the air within a coverage area. However, with this implementation mode, in a process that the terminal devices on the ground, in the ocean and in the air access a network based on a same signaling beam, collision and conflict with preamble sequences easily occurs, resulting in a low success rate of random access and a low efficiency of the random access, so that the terminal devices may not obtain the communication services in time.

Embodiments of the present disclosure provide a random access method, a random access device, a spatial terminal, a network device, a communication system, a storage medium, a program product, and a computer program. A first random access message is sent to the network device by the spatial terminal, and a response message from the network device is received, where the first random access message carries a first preamble sequence, the first preamble sequence is generated based on a target mask, and the target mask is associated with a height where the spatial terminal is located, so that the spatial terminal may initiate the random access using the first preamble sequence associated with the height where the spatial terminal is located, thereby avoiding the collision and conflict with preamble sequences used by the spatial terminals at other heights, improving the success rate of the random access of the spatial terminal, and further improving the efficiency of the random access.

In order to better understand the random access method disclosed by embodiments of the present disclosure, the communication system to which embodiments of the present disclosure are applicable will first be described below.

FIG. 1 is an architectural diagram illustrating a communication system according to embodiments of the present disclosure. FIG. 1 is a schematic diagram illustrating the communication system as a satellite communication system and the network device as a satellite.

As shown in FIG. 1, the satellite communication system may include, but is not limited to, a network device 101 and a spatial terminal 102.

In some embodiments, the network device 101 is, for example, a node or device that accesses the terminal device to a wireless network. The network device may include at least one of the satellite, an evolved NodeB (eNB) in a 5G communication system, a next generation eNB (ng-eNB), a next generation NodeB (gNB), a nodeB (NB), a home nodeB (HNB), a home evolved nodeB (HeNB), a wireless backhaul device, a radio network controller (RNC), a base station controller (BSC), a base transceiver station (BTS), a base band unit (BBU), a mobile switching centre, a base station in a 6G communication system, an open ran, a cloud ran, a base station in another communication system, or an access node in a Wi-Fi system, but is not limited thereto.

In some embodiments, the spatial terminal 102 is a terminal device at any position in a space such as the ground, the ocean or the air, for example, including at least one of a mobile phone, a wearable device, an Internet of Things device, an automobile with a communication function, a smart automobile, an aircraft, a Pad, a computer with a wireless transceiver function, a virtual reality (VR) terminal device, an augmented reality (AR) terminal device, a wireless terminal device in industrial control, a wireless terminal device in self-driving, a wireless terminal device in remote medical surgery, a wireless terminal device in smart grid, a wireless terminal device in transportation safety, a wireless terminal device in smart city, or a wireless terminal device in a smart home, but not limited thereto.

It is understood that the communication system described in embodiments of the present disclosure is for a purpose of describing the technical solutions of embodiments of the present disclosure more clearly, and does not constitute a limitation on the technical solutions provided by embodiments of the present disclosure. It is known to those skilled in the art that the technical solutions provided by embodiments of the present disclosure are equally applicable to similar technical problems as a system architecture evolves and new service scenarios emerge.

Embodiments of the present disclosure described below may be applied to, but are not limited to, the communication system or part of main bodies shown in FIG. 1. The main bodies shown in FIG. 1 are examples. The communication system may include all or some of the main bodies in FIG. 1, or may include other main bodies besides FIG. 1. The number and form of the main bodies are arbitrary, the main bodies may be physical or virtual, a connection relationship between the main bodies is an example, the main bodies may not be connected or may be connected, the connection may be in any manner, the connection may be a direct connection or an indirect connection, and the connection may be a wired connection or a wireless connection.

The random access method provided by embodiments of the present disclosure is applicable to a random access process such as a four-step random access process and a two-step random access process.

The following is illustrated for examples of the four-step random access process and the two-step random access process.

Figure 2:
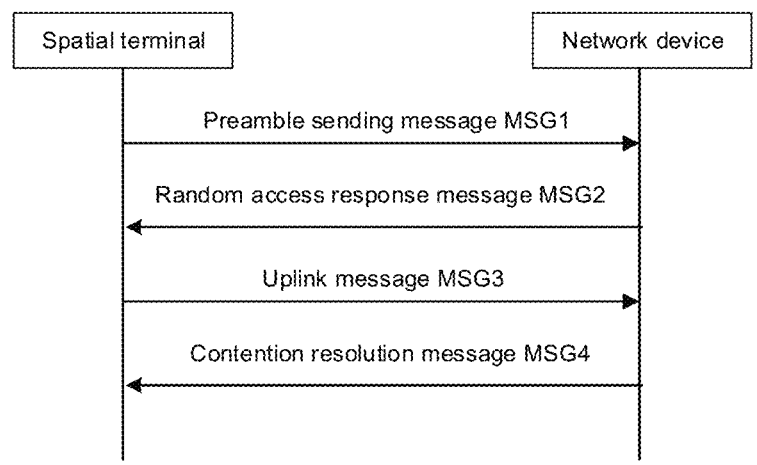
FIG. 2 is a schematic diagram illustrating a four-step random access process.

Referring to FIG. 2, FIG. 2 is a schematic diagram illustrating the four-step random access process. The contention-based four-step random access process includes: four messages MSG1, MSG2, MSG3, MSG4. The MSG1 represents a preamble sending message; the MSG2 represents a random access response message; the MSG3 represents an uplink message including uplink data sent by the spatial terminal on an allocated uplink resource in a case of receiving the MSG2, where the uplink message includes an identifier of the spatial terminal for contention resolution of the MSG4; the MSG4 represents a contention resolution message returned to a successfully accessed spatial terminal in a case where the network device receives the uplink message of the spatial terminal.

Figure 3:
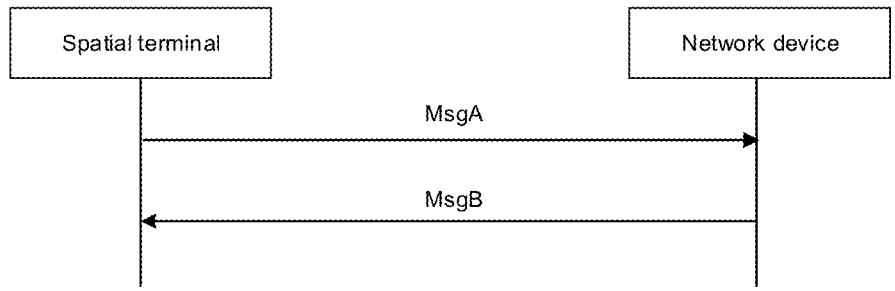
FIG. 3 is a schematic diagram illustrating a two-step random access process.

Referring to FIG. 3, FIG. 3 is a schematic diagram illustrating the two-step random access process. The two-step random access process includes: MSGA and MSGB, where the MSGA includes the MSG1 and the MSG3 in the four-step random access process, and the MSGB includes the MSG2 and the MSG4 in the four-step random access process. The two-step random access process not only reduces a waiting delay of an access flow, but further reduces control signaling overhead.

Hereinafter, the random access method applied to the spatial terminal according to embodiments of the present disclosure will be described in detail.

Figure 4:
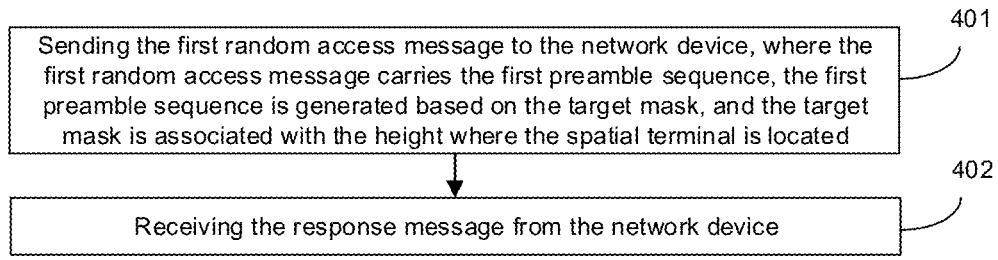
FIG. 4 is a flow diagram illustrating a random access method according to embodiments of the present disclosure.

FIG. 4 is a flow diagram illustrating a random access method according to embodiments of the present disclosure. As shown in FIG. 4, embodiments of the present disclosure relates to a method applied to the spatial terminal, and the method includes the following steps 401-402.

In step 401, the first random access message is sent to the network device, where the first random access message carries the first preamble sequence, the first preamble sequence is generated based on the target mask, and the target mask is associated with the height where the spatial terminal is located.

The first random access message, being a message used for initiating the random access, may be the MSG1 in the four-step random access process, may further be the MSGA in the two-step random access process, and may further be a message used for initiating the random access in other random access processes, and this is not limited in the present disclosure. In a case where the random access method is applicable to the four-step random access process, the first random access message may be the MSG1; in a case where the random access method is applicable to the two-step random access process, the first random access message may be the MSGA.

It is understood that taking the MSG1 in the four-step random access process and the MSGA in the two-step random access process as an example, the MSG1 and the MSGA carry a preamble code of the spatial terminal, further referred to as a preamble code sequence or the preamble sequence, which is used for identifying an identity of a user equipment (UE) in the random access. In a process of accessing network based on the same signaling beam for the spatial terminals at different heights, the collision and conflict with the adopted preamble sequence easily occurs, resulting in the low success rate of the random access and the low efficiency of the random access, so that the spatial terminals may not obtain the communication service in time.

In some embodiments, masks corresponding to multiple heights may be arranged, and the spatial terminals at different heights may be assigned the masks corresponding to the respective heights. For example, a mask corresponding to the first height is allocated to the spatial terminal at the first height, and a mask corresponding to the second height is allocated to the spatial terminal at the second height. The first height and the second height are different, and the mask corresponding to the first height and the mask corresponding to the second height may be the same or different.

The multiple heights may be multiple absolute height values, or multiple relative height values based on a certain point, or multiple height ranges obtained by dividing in a height dimension, and the present disclosure is not limited thereto. The first height and the second height may be any two of the multiple heights.

A manner in which division is made in the height dimension to obtain the multiple height ranges may be predefined. For example, a customized setting may be performed in a manner of dividing a BeiDou grid location code according to a height hierarchy, or based on a type, a distribution characteristic and a traffic type of the spatial terminal of the communication system, and embodiments of the present disclosure are not limited thereto.

The first random access message initiated by the spatial terminal may carry the first preamble sequence generated based on the target mask, where the target mask is a mask corresponding to the height where the spatial terminal is allocated and is associated with the height where the spatial terminal is located, so that the first preamble sequence is used as a preamble sequence used in a case of initiating the random access.

In step 402, the response message from the network device is received.

In some embodiments, the response message may be the MSG2 in the four-step random access process.

In some embodiments, the response message may be the MSGB in the two-step random access process.

Since the target mask used by the spatial terminal is associated with the height where the spatial terminal is located, the first preamble sequence generated based on the target mask is further associated with the height where the spatial terminal is located. In a case where the target mask corresponding to the height where the spatial terminal is located is different from masks corresponding to other heights, the first preamble sequence used by the spatial terminal to initiate the random access is different from the preamble sequences used by the spatial terminal at other heights to initiate the random access, so that the collision and conflict with the preamble sequence used by the spatial terminal at other heights may be avoided, thereby improving the success rate of the random access of the spatial terminal, and improving the efficiency of the random access.

It is understood that the random access method provided by embodiments of the present disclosure may be applied to the satellite communication system in a scenario where the same beam is used to simultaneously provide the communication services for the terminal device on the ground, in the ocean and in the air within the coverage area thereof, to improve the utilization rate of the beam resources, the flexibility scheduling of the beam resources and the capacity of the communication system. Furthermore, in this scenario, in a process of accessing the network based on the same signaling beam for each terminal device on the ground, in the ocean and in the air, the terminal devices at different heights may initiate the random access by using different preamble sequences, to avoid the collision and conflict with the preamble sequence, improve the success rate of the random access and improve the efficiency of the random access, so that the terminal devices may obtain the communication services in time.

Accordingly, with the random access method provided by embodiments of the present disclosure, the first random access message is sent to the network device by the spatial terminal, and the response message from the network device is received, where the first random access message carries the first preamble sequence, the first preamble sequence is generated based on the target mask, and the target mask is associated with the height where the spatial terminal is located, so that the spatial terminal may initiate the random access using the first preamble sequence associated with the height where the spatial terminal is located, thereby avoiding the collision and conflict with the preamble sequences used by the spatial terminals at other heights, improving the success rate of the random access of the spatial terminal, and further improving the efficiency of the random access.

Figure 5:
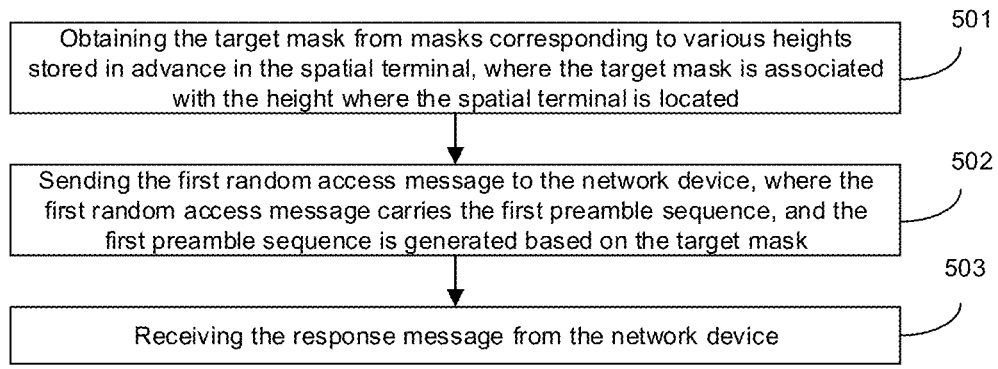
FIG. 5 is a flow diagram illustrating a random access method according to embodiments of the present disclosure.

FIG. 5 is a flow diagram illustrating a random access method according to embodiments of the present disclosure. As shown in FIG. 5, embodiments of the present disclosure relates to a method, applied to the spatial terminal, including the following steps 501-503.

In step 501, the target mask is obtained from masks corresponding to various heights stored in advance in the spatial terminal, where the target mask is associated with the height where the spatial terminal is located.

In some embodiments, the masks corresponding to various heights may be arranged, and the masks corresponding to various heights may be stored in advance in the spatial terminal, so that the spatial terminal may obtain the mask corresponding to the height where the spatial terminal is located from the pre-stored masks corresponding to various heights, and the mask is the target mask associated with the height where the spatial terminal is located.

In some embodiments, masks corresponding to any first height of the multiple heights, and masks corresponding to any second height of the multiple heights, may be correlated to be mutually orthogonal or quasi-orthogonal. In this way, regarding a spatial terminal at the first height and a spatial terminal at the second height, the collision and conflict with the preamble sequence may be avoided to a maximum extent, and the success rate of the random access of the spatial terminal may be improved, thereby improving the efficiency of the random access. For example, the masks corresponding to various heights may be a gold code in a code division multiple access (CDMA) system.

The multiple heights may be multiple absolute height values, or multiple relative height values based on a certain point, or multiple height ranges divided in the height dimension, and the present disclosure is not limited thereto. The first height and the second height may be any two of the multiple heights. A manner of dividing in the height dimension to obtain the multiple height ranges may be predefined.

In some embodiments, there may be only a case of mutual orthogonality between the masks corresponding to various heights. For example, masks corresponding to a height A, a height B, a height C and a height D may be mutually orthogonal.

In some embodiments, there may be only a case of mutual quasi-orthogonality between the masks corresponding to various heights. For example, the masks corresponding to the height A, the height B, the height C and the height D may be mutually quasi-orthogonal.

In some embodiments, there may be both a case of mutual orthogonality and a case of mutual quasi-orthogonality between the masks corresponding to various heights. For example, the masks corresponding to the height A, the height B and the height C may be mutually orthogonal, the masks corresponding to the height D and the height A may be mutually quasi-orthogonal, the masks corresponding to the height D and the height B may be mutually quasi-orthogonal, and the masks corresponding to the height D and the height C may be mutually quasi-orthogonal.

In step 502, the first random access message is sent to the network device, where the first random access message carries the first preamble sequence, and the first preamble sequence is generated based on the target mask.

In some embodiments, the first preamble sequence may be obtained by multiplying a second preamble sequence and the target mask. The second preamble sequence may be obtained randomly from a set of preamble sequences, or may be obtained from a set of preamble sequences by other means, and the present disclosure is not limited thereto. The set of preamble sequences is a pre-generated set of the preamble sequences used for accessing the network of the network device, and includes multiple preamble sequences. The set of preamble sequences may be sent to various spatial terminals by the network device, and the spatial terminal accessing the network of the network device based on the same signaling beam may obtain the second preamble sequence from the same set of preamble sequences. The preamble sequence in the set of preamble sequences, for example, may be a Zadoff-chu (ZC) sequence defined by a mobile communication system.

In this way, embodiments of the present disclosure is equivalent to taking a preamble sequence used by a conventional mobile communication system as the second preamble sequence. On the basis of the second preamble sequence, the target mask associated with the height where the spatial terminal is located is used to further process the second preamble sequence to obtain the first preamble sequence, and the first preamble sequence is taken as a preamble sequence used in the case of initiating the random access. In this way, regarding a spatial terminal at a certain height, even if the same second preamble sequence is used as the spatial terminals at other heights, different masks may be used to obtain different first preamble sequences, thereby avoiding the collision and conflict with the preamble sequence used by the spatial terminals at other heights, and improving the success rate of the random access of the spatial terminal, further improving the efficiency of the random access.

In step 503, the response message from the network device is received.

Accordingly, with the random access method provided by embodiments of the present disclosure, the target mask is obtained from the masks corresponding to various heights stored in advance in the spatial terminal, where the target mask is associated with the height where the spatial terminal is located; the first random access message is sent to the network device, where the first random access message carries the first preamble sequence, and the first preamble sequence is generated based on the target mask; and the response message from the network device is received. In this way, the spatial terminal may initiate the random access using the first preamble sequence associated with the height where the spatial terminal is located, thereby avoiding the collision and conflict with the preamble sequences used by the spatial terminals at other heights, improving the success rate of the random access of the spatial terminal, and further improving the efficiency of the random access. Furthermore, the masks corresponding to various heights are stored in advance in the spatial terminal, so that the spatial terminal may conveniently obtain the target mask corresponding to the height where the spatial terminal is located, thereby further improving the efficiency of the random access.

Figure 6:
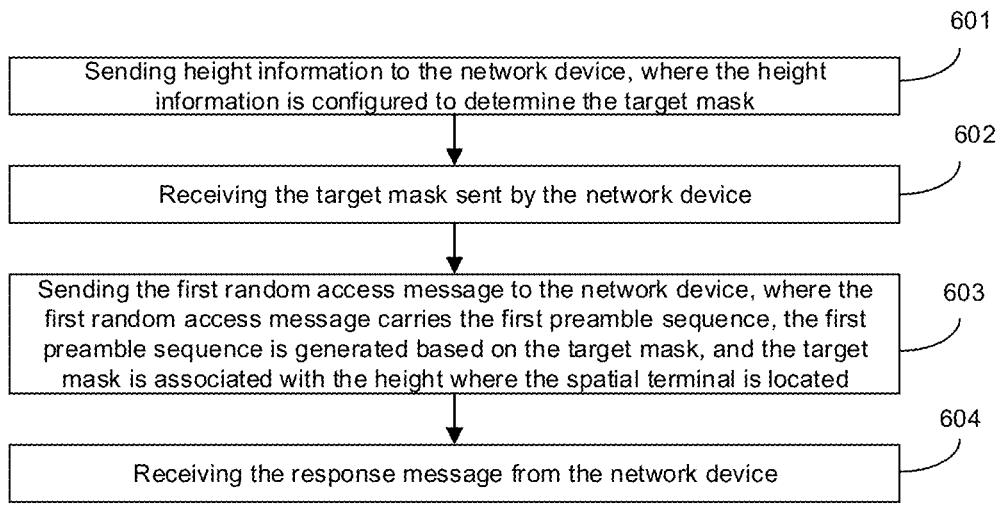
FIG. 6 is a flow diagram illustrating a random access method according to embodiments of the present disclosure.

FIG. 6 is a flow diagram illustrating a random access method according to embodiments of the present disclosure. As shown in FIG. 6, embodiments of the present disclosure relates to a method, applied to the spatial terminal, including the following steps 601-604.

In step 601, height information is sent to the network device, where the height information is configured to determine the target mask.

In some embodiments, the spatial terminal may enhance payload with navigation information of a global navigation satellite system (GNSS), obtain the height information thereof, and send the height information to the network device, so that the network device assigns the target mask corresponding to the spatial terminal based on the height information.

In step 602, the target mask sent by the network device is received.

In some embodiments, the masks corresponding to various heights may be arranged, and the network device may determine the height where the spatial terminal is located according to the height information about the spatial terminal, and send the mask corresponding to the height where the spatial terminal is located as the target mask to the spatial terminal, so that the spatial terminal may receive the target mask sent by the network device.

In some embodiments, the masks corresponding to any first height of the multiple heights, and the masks corresponding to any second height of the multiple heights, may be correlated to be mutually orthogonal or mutually quasi-orthogonal. The manner in which the masks corresponding to various heights are arranged may be referred to other embodiments, and the description thereof will not be repeated here.

In step 603, the first random access message is sent to the network device, where the first random access message carries the first preamble sequence, the first preamble sequence is generated based on the target mask, and the target mask is associated with the height where the spatial terminal is located.

In some embodiments, the first preamble sequence may be obtained by multiplying the second preamble sequence and the target mask.

In step 604, the response message from the network device is received.

Accordingly, with the random access method provided by embodiments of the present disclosure, the height information is sent to the network device, where the height information is configured to determine the target mask; the target mask sent by the network device is received; the first random access message is sent to the network device, where the first random access message carries the first preamble sequence, the first preamble sequence is generated based on the target mask, and the target mask is associated with the height where the spatial terminal is located; and the response message from the network device is received. In this way, the spatial terminal may initiate the random access using the first preamble sequence associated with the height where the spatial terminal is located, thereby avoiding the collision and conflict with the preamble sequences used by the spatial terminals at other heights, improving the success rate of the random access of the spatial terminal, and further improving the efficiency of the random access. Furthermore, the target mask associated with the height where the spatial terminal is located is obtained from the network device by the spatial terminal, so that a storage space of the spatial terminal may be saved.

Figure 7:
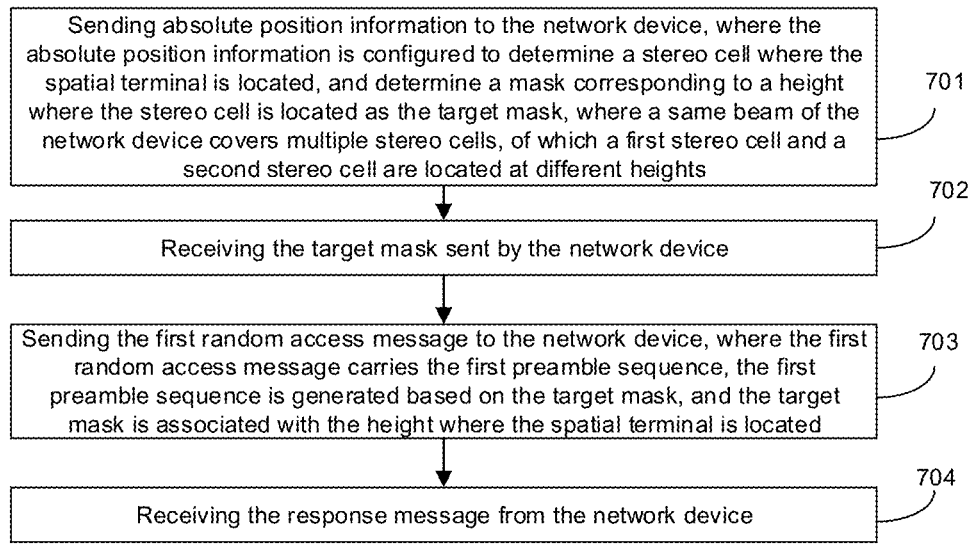
FIG. 7 is a flow diagram illustrating a random access method according to embodiments of the present disclosure.

FIG. 7 is a flow diagram illustrating a random access method according to embodiments of the present disclosure. As shown in FIG. 7, embodiments of the present disclosure relates to a method, applied to the spatial terminal, including the following steps 701-704.

In step 701, absolute position information is sent to the network device, where the absolute position information is configured to determine a stereo cell where the spatial terminal is located, and determine a mask corresponding to a height where the stereo cell is located as the target mask, where a same beam of the network device covers multiple stereo cells, of which a first stereo cell and a second stereo cell are located at different heights.

The absolute position information may include the height information and longitude and latitude information of the spatial terminal. The longitude and latitude information includes longitude information and latitude information.

In some embodiments, the spatial terminal may enhance the payload through the navigation information of the GNSS, obtain the absolute position information thereof, and send the absolute position information to the network device, so that the network device assigns the target mask corresponding to the spatial terminal based on the absolute position information.

In some embodiments, a three-dimensional space may be divided into the multiple stereo cells, a coverage area of each stereo cell includes a three-dimensional stereo area, the same beam of the network device covers the multiple stereo cells, and the heights of the first stereo cell and the second stereo cell in the multiple stereo cells are different. A manner of dividing the three-dimensional space into the multiple stereo cells may be arranged as required, and the present disclosure is not limited thereto.

The first stereo cell and the second stereo cell are any cells in the multiple stereo cells.

As a possible implementation, the multiple height ranges may be obtained by dividing in the height dimension, and the multiple height ranges may be taken as a unified height reference. Based on the unified height reference, a three-dimensional stereo area covered by the same beam of the same network device in the same height range may be taken as the stereo cell.

The manner in which division is made in the height dimension to obtain the multiple height ranges may be predefined. For example, the customized setting may be performed in the manner of dividing the BeiDou grid location code according to the height hierarchy, or based on the type, the distribution characteristic and the traffic type of the spatial terminal of the communication system, and embodiments of the present disclosure are not limited thereto.

Figure 8:
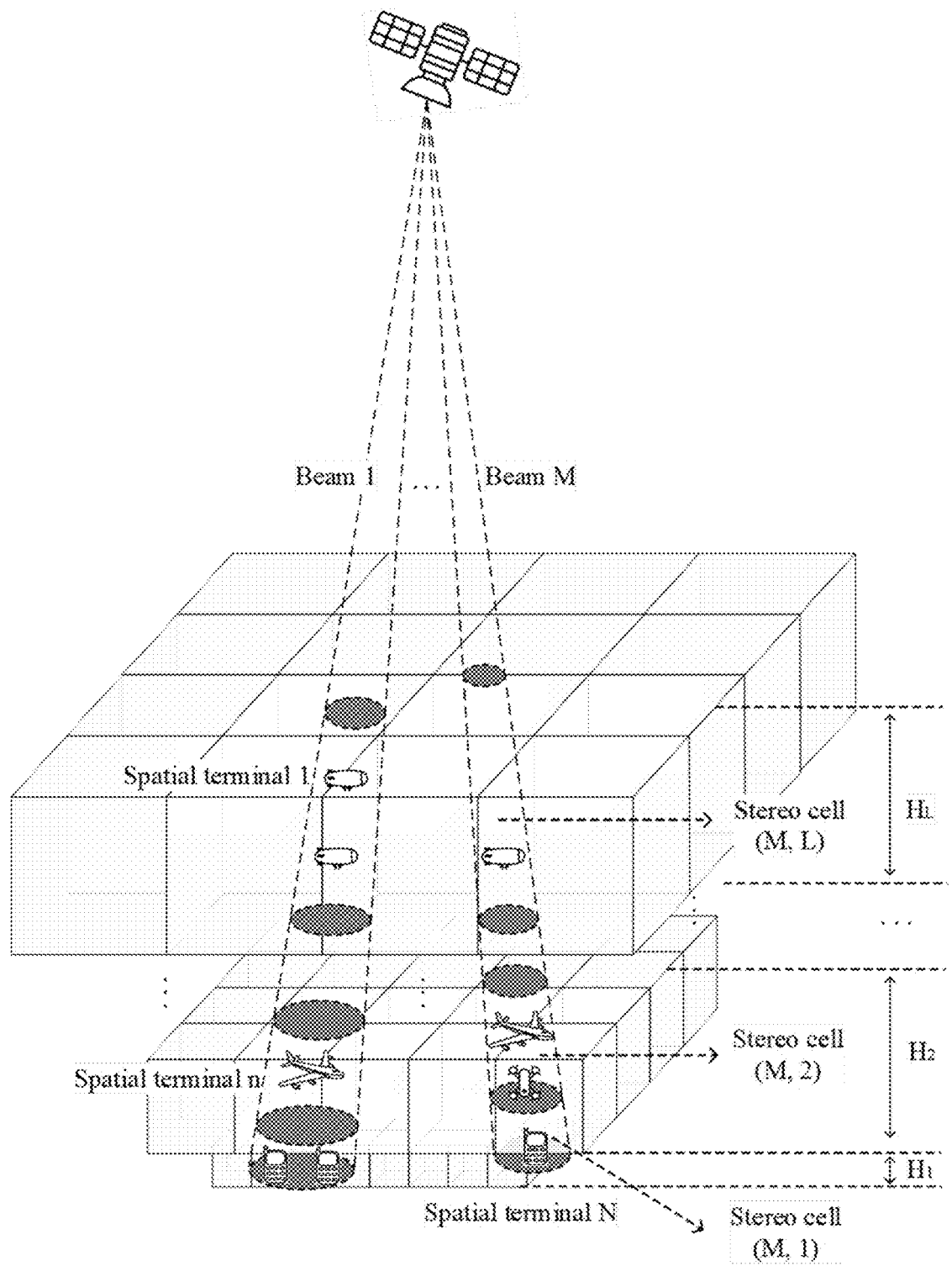
FIG. 8 is an exemplary diagram illustrating a manner of dividing a stereo cell according to embodiments of the present disclosure.

With reference to a schematic diagram illustrating a manner for dividing the stereo cell shown in FIG. 8, taking the network device as the satellite as an example, a globally uniformly addressed stereo cell may be established.

With reference to FIG. 8, with the Beidou grid location code as a reference, L height ranges may be obtained by dividing in the height dimension, namely $H_1$, $H_2$, ... $H_L$ in FIG. 8, where L is an integer greater than 1. Taking the satellite in the satellite communication system as an example, the satellite includes M beams, where M is an integer greater than or equal to 1. Taking a set of L height ranges as a uniform altitude reference, and taking the reference as a basic condition, the coverage area of the M beams of the satellite may be divided into the multiple stereo cells. The three-dimensional stereo area covered by the same beam of the same satellite in the same height range is a stereo cell. For example, the beam M covers L stereo cells, where the L stereo cells are respectively in the L height ranges, and identities of the L stereo cells may be respectively: a stereo cell (M, 1), a stereo cell (M, 2), . . . a stereo cell (M, L). The stereo cell identified as (M, L) includes a three-dimensional stereo area covered by the $M^{th}$ beam at the $L^{th}$ height range.

In some embodiments, a mask corresponding to a height where each stereo cell is located may be assigned to each stereo cell according to the height where each stereo cell is located. The assigned masks may be the same or different for any two stereo cells with different heights. The assigned masks may be the same or different for any two stereo cells at the same height.

For example, heights where the multiple stereo cells are located, including a height A, a height B, a height C and a height D, are taken as an example. A mask C1 corresponding to the height A may be assigned for a stereo cell at the height A; a mask C2 corresponding to the height B may be assigned for a stereo cell at the height B; a mask C3 corresponding to the height C may be assigned for a stereo cell at the height C; a mask C4 corresponding to the height D may be assigned for a stereo cell at the height D, where C1, C2, C3, C4 are different. In this way, it is possible to assign the same mask for the stereo cells at the same height and different masks for the stereo cells at different heights.

Alternatively, a mask C5 corresponding to the height A and the height B may be assigned to the stereo cell at the height A and the stereo cell at the height B, and a mask C6 corresponding to the height C and the height D may be assigned to the stereo cell at the height C and the stereo cell at the height D, where C5 and C6 are different. In this way, it is possible to assign the same mask for stereo cells at the same height, and to assign different masks for stereo cells at partially different heights among the multiple heights.

It should be noted that the above-mentioned manner for assigning the mask corresponding to the height where each stereo cell is located according to the height where each stereo cell is located is merely an example, and in practical applications, other manners for assigning the mask corresponding to each stereo cell may further be used, and the present disclosure is not limited thereto.

In addition, it should be noted that the coverage area of the stereo cell in embodiments of the present disclosure includes the three-dimensional stereo area. The height where the stereo cell is located may be a height where any position of the stereo cell is located, and the height may be an absolute height value or a relative height value, and may further be a height range. Alternatively, the height where the stereo cell is located may further be the height range where the whole stereo cell is located. For example, in a case where the three-dimensional space is divided into the multiple stereo cells in the manner shown in FIG. 8, the height where the stereo cell (M, L) is located may be understood as the height range $H_L$, and embodiments of the present disclosure do not limit the manner for defining the height where the stereo cell is located.

In some embodiments, masks assigned to the stereo cells at any first heights of the multiple heights and masks assigned to the stereo cells at any second heights of the multiple heights may be mutually orthogonal or mutually quasi-orthogonal. In this way, regarding the spatial terminal within the stereo cell at the first height and the spatial terminal within the stereo cell at the second height, the collision and conflict with the preamble sequence may be avoided to the maximum extent, thereby improving the success rate of the random access of the spatial terminal, and further improving the efficiency of the random access. For example, stereo cells at different heights may be assigned the gold code in the CDMA system.

In some embodiments, there may be only a case of mutual orthogonality between masks corresponding the stereo cells at different heights. For example, the masks corresponding to the stereo cell at the height A, the stereo cell at the height B, the stereo cell at the height C and the stereo cell at the height D may be mutually orthogonal.

In some embodiments, there may be only a case of mutual quasi-orthogonality between masks corresponding the stereo cells at different heights. For example, the masks corresponding to the stereo cell at the height A, the stereo cell at the height B, the stereo cell at the height C and the stereo cell at the height D may be mutually quasi-orthogonal.

In some embodiments, there may be both a case of mutual orthogonality and a case of mutual quasi-orthogonality between masks corresponding the stereo cells at different heights. For example, the masks corresponding to the stereo cell at the height A, the stereo cell at the height B and the stereo cell at the height C may be mutually orthogonal; the masks corresponding to the stereo cell at the height D and the stereo cell at the height A, the masks corresponding to the stereo cell at the height D and the stereo cell at the height B, and the masks corresponding to the stereo cell at the height D and the stereo cell at the height C may be mutually quasi-orthogonal.

In some embodiments, the network device may determine the stereo cell where the spatial terminal is located from the multiple stereo cells according to the absolute position information of the spatial terminal, and take the mask corresponding to the height where the stereo cell is located as the target mask associated with the height where the spatial terminal is located.

With reference to FIG. 8, taking a number of the spatial terminals to be served by the satellite as N as an example, where N is an integer greater than 0. Regarding an $n^{th}$ spatial terminal, the network device may determine a stereo cell where the $n^{th}$ spatial terminal is located from the multiple stereo cells according to the absolute position information about the $n^{th}$ spatial terminal, and take the mask corresponding to the height where the stereo cell is located as the target mask associated with a height where the $n^{th}$ spatial terminal is located, where n is an integer between 1 and N, including a case where n is 1 or n is N.

In step 702, the target mask sent by the network device is received.

In step 703, the first random access message is sent to the network device, where the first random access message carries the first preamble sequence, the first preamble sequence is generated based on the target mask, and the target mask is associated with the height where the spatial terminal is located.

In some embodiments, the first preamble sequence may be obtained by multiplying the second preamble sequence and the target mask.

In step 704, the response message from the network device is received.

With embodiments of the present disclosure, the three-dimensional space are divided into the multiple stereo cells, so that the coverage range of the same beam may be divided more finely. In a case of not considering the height dimension, the stereo cells covered by the same beam will be degenerated into two-dimensional plane cells, which has capability of forward compatibility with traditional plane cells. Moreover, by using this stereo cell division mode, the spatial terminals at different heights may be divided into different stereo cells, and the same beam is used to serve the spatial terminals at different heights within the coverage range thereof, thereby improving the utilization rate of the beam resources and the flexibility of resource allocation of the communication system, enhancing service capability of the communication system for the spatial terminals such as the unmanned aerial vehicles, the high-altitude platforms and the low-earth orbiting satellites, and improving the capacity of the communication system. The absolute position information is sent to the network device by the spatial terminal, where the absolute position information is configured to determine the stereo cell where the spatial terminal is located, and determine the mask corresponding to the height where the stereo cell is located as the target mask, where the same beam of the network device covers the multiple stereo cells, and the heights of the first stereo cell and the second stereo cell in the multiple stereo cells are different. The target mask sent by the network device is received; the first random access message is sent to the network device, where the first random access message carries the first preamble sequence, the first preamble sequence is generated based on the target mask, and the target mask is associated with the height where the spatial terminal is located; and the response message from the network device is received. In this way, the spatial terminal accesses the network of the network device on the basis of dividing the stereo cell, and the spatial terminal may initiate the random access using the first preamble sequence associated with the height where the spatial terminal is located, thereby avoiding the collision and conflict with the preamble sequences used by the spatial terminals at other heights, improving the success rate of the random access of the spatial terminal, and further improving the efficiency of the random access. Furthermore, the target mask is obtained from the network device by the spatial terminal, so that the storage space of the spatial terminal may be saved.

The random access method shown in embodiments of the present disclosure is described below with reference to the two-step random access process as an example, where the random access method is applied to the two-step random access process. The implementation process is a scenario where one random access is successful.

Figure 9:
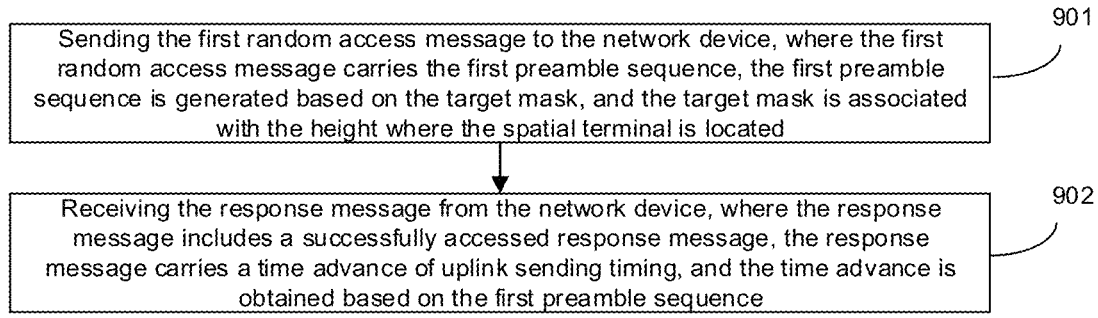
FIG. 9 is a flow diagram illustrating a random access method according to embodiments of the present disclosure.

FIG. 9 is a flow diagram illustrating a random access method according to embodiments of the present disclosure. As shown in FIG. 9, embodiments of the present disclosure relates to a method, applied to the spatial terminal, including the following steps 901-902.

In step 901, the first random access message is sent to the network device, where the first random access message carries the first preamble sequence, the first preamble sequence is generated based on the target mask, and the target mask is associated with the height where the spatial terminal is located.

The first random access message, which is a message for initiating the random access, may be the MSGA in the two-step random access process.

The first random access message carries two parts of content, one being the first preamble sequence generated based on the target mask, and the other being the uplink data. In some embodiments, the first preamble sequence is sent to the network device by a physical random access channel (PRACH); and the uplink data is sent to the network device by a transmission resource associated with the first preamble sequence on a physical uplink shared channel (PUSCH).

In some embodiments, the first preamble sequence is obtained by multiplying the second preamble sequence and the target mask.

In step 902, the response message from the network device is received, where the response message includes a successfully accessed response message, the response message carries a time advance of uplink sending timing, and the time advance is obtained based on the first preamble sequence.

The successfully accessed response message may be a successfully accessed MSGB in the two-step random access process.

In some embodiments, the network device detects the first preamble sequence carried in the first random access message, and may calculate the time advance of the uplink sending timing of the spatial terminal based on the first preamble sequence, and decode the uplink data on the transmission resource associated with the first preamble sequence. In some embodiments, the network device may derive the second preamble sequence based on the first preamble sequence and calculate the timing advance based on the second preamble sequence.

In a case where the network device successfully decodes the uplink data on the transmission resource associated with the first preamble sequence, the network device may determine that the first preamble sequence adopted by the spatial terminal does not collide with the preamble sequences adopted by other spatial terminals, and the spatial terminal may access the network by the first preamble sequence, so that the network device may send the successfully accessed response message to the spatial terminal. The successfully accessed response message carries the time advance of the uplink sending timing, and the time advance is configured for the spatial terminal to adjust the uplink sending timing. The successfully accessed response message may include first indication information, and the first indication information indicates that the response message is the successfully accessed response message.

In some embodiments, the uplink data sent by the spatial terminal further carries an identity of the spatial terminal for the contention resolution. In the case where the network device successfully decodes the uplink data on the transmission resource associated with the first preamble sequence, the network device may carry the identity in the successfully accessed response message and send the identity to the spatial terminal.

In some embodiments, the successfully accessed response message may be sent to the spatial terminal by a physical downlink control channel (PDCCH).

In some embodiments, the spatial terminal may initiate a receiving window of the MSGB on the PDCCH in response to sending the first random access message to the network device, and the random access process is successful and ends in case that the spatial terminal receives the successfully accessed MSGB based on the receiving window.

With the random access method provided by embodiments of the present disclosure, the first random access message is sent to the network device by the spatial terminal, where the first random access message carries the first preamble sequence, the first preamble sequence is generated based on the target mask, and the target mask is associated with the height where the spatial terminal is located; and the response message from the network device is received, where the response message includes the successfully accessed response message, the response message carries the time advance of the uplink sending timing, and the time advance is obtained based on the first preamble sequence. In this way, the spatial terminal may initiate the random access using the first preamble sequence associated with the height where the spatial terminal is located and complete the random access, thereby avoiding the collision and conflict with the preamble sequences used by the spatial terminals at other heights, improving the success rate of the random access of the spatial terminal, and further improving the efficiency of the random access.

Figure 10:
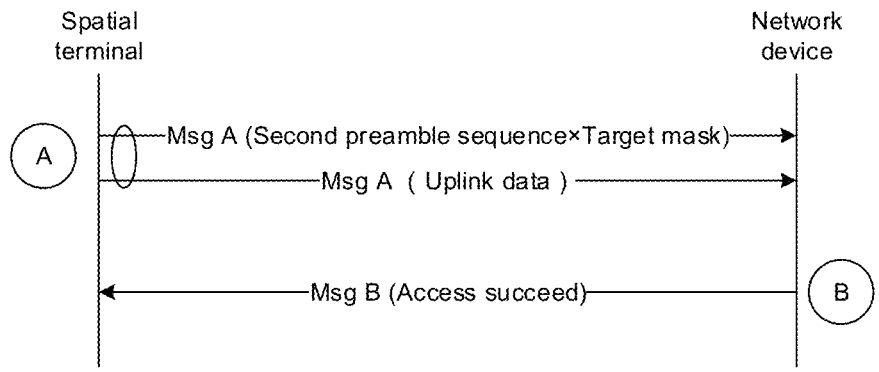
FIG. 10 is a flow diagram illustrating a random access method according to embodiments of the present disclosure.

In some embodiments, referring to FIG. 10, the spatial terminal may send the MSGA to the network device and initiate the receiving window of the MSGB on the PDCCH. The MSGA carries the first preamble sequence and the uplink data. The first preamble sequence is sent to the network device by the PRACH. The uplink data is sent to the network device by the transmission resource associated with the first preamble sequence on the PUSCH.

The first preamble sequence is obtained by multiplying the second preamble sequence and the target mask, and the target mask is associated with the height where the spatial terminal is located.

In a case where the network device detects the first preamble sequence carried by the MSGA, the second preamble sequence may be obtained based on the first preamble sequence, the time advance of the uplink sending timing of the spatial terminal is calculated based on the second preamble sequence, and the uplink data is decoded on the transmission resource associated with the first preamble sequence. In a case where the decoding is successful, the network device may determine that the first preamble sequence adopted by the spatial terminal does not collide with the first preamble sequences adopted by other spatial terminals, and the spatial terminal may access the network by the first preamble sequence, so that the network device may send the successfully accessed MSGB to the spatial terminal. The successfully accessed MSGB carries the time advance of the uplink sending timing and the identity of the spatial terminal.

Based on the receiving window of the MSGB started on the PDCCH, in the case that the spatial terminal receives the successfully accessed MSGB, the random access process is successful and ends.

The random access method shown in embodiments of the present disclosure is described below with reference to the two-step random access process as an example, where the random access method is applied to the two-step random access process. The implementation process is a scenario of one random access backoff.

Figure 11:
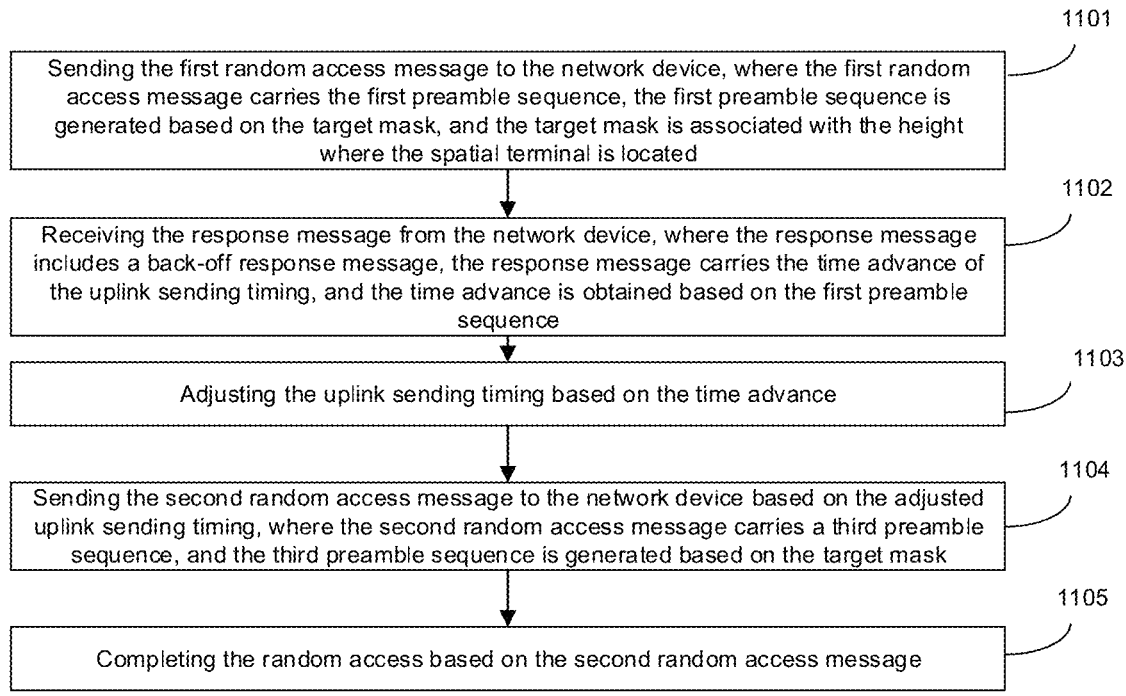
FIG. 11 is a flow diagram illustrating a random access method according to embodiments of the present disclosure.

FIG. 11 is a flow diagram illustrating a random access method according to embodiments of the present disclosure. As shown in FIG. 11, embodiments of the present disclosure relates to a method, applied to the spatial terminal, including the following steps 1101-1105.

In step 1101, the first random access message is sent to the network device, where the first random access message carries the first preamble sequence, the first preamble sequence is generated based on the target mask, and the target mask is associated with the height where the spatial terminal is located.

The first random access message, which is the message for initiating the random access, may be the MSGA in the two-step random access process.

The first random access message carries two parts of content, one being the first preamble sequence generated based on the target mask, and the other being the uplink data. In some embodiments, the first preamble sequence is sent to the network device by the PRACH, and the uplink data is sent to the network device by the transmission resource associated with the first preamble sequence on the PUSCH.

In some embodiments, the first preamble sequence is obtained by multiplying the second preamble sequence and the target mask.

In step 1102, the response message from the network device is received, where the response message includes a back-off response message, the response message carries the time advance of the uplink sending timing, and the time advance is obtained based on the first preamble sequence.

The back-off response message may be a back-off MSGB in the two-step random access process.

In some embodiments, the network device detects the first preamble sequence carried in the first random access message, and may calculate the time advance of the uplink sending timing of the spatial terminal based on the first preamble sequence, and decode the uplink data on the transmission resource associated with the first preamble sequence. In some embodiments, the network device may derive the second preamble sequence based on the first preamble sequence and calculate the timing advance based on the second preamble sequence.

In a case where the network device unsuccessfully decodes the uplink data on the transmission resource associated with the first preamble sequence, the network device may determine that the first preamble sequence adopted by the spatial terminal collides with the preamble sequences adopted by other spatial terminals, and the spatial terminal may not access the network by the first preamble sequence, so that the network device may send the back-off response message to the spatial terminal. The back-off response message carries the time advance of the uplink sending timing, and the time advance is configured for the spatial terminal to adjust the uplink sending timing. The back-off response message may include second indication information, and the second indication information indicates that the response message is the back-off response message.

In some embodiments, the uplink data sent by the spatial terminal further carries the identity of the spatial terminal for the contention resolution. In the case where the network device unsuccessfully decodes the uplink data on the transmission resource associated with the first preamble sequence, the identity carried in the back-off response message does not match the identity of the spatial terminal.

In some embodiments, the back-off response message may be sent to the spatial terminal by the PDCCH.

In step 1103, the uplink sending timing is adjusted based on the time advance.

In step 1104, the second random access message is sent to the network device based on the adjusted uplink sending timing, where the second random access message carries a third preamble sequence, and the third preamble sequence is generated based on the target mask.

In some embodiments, the spatial terminal may initiate the receiving window of the MSGB on the PDCCH in response to sending the first random access message to the network device. In a case where the spatial terminal receives the back-off MSGB based on the receiving window, the uplink sending timing may be adjusted based on the time advance carried by the back-off MSGB, and the third preamble sequence may be re-acquired. Further based on the adjusted uplink sending timing, the second random access message carrying the third preamble sequence is sent to the network device.

The third preamble sequence may be obtained by multiplying a fourth preamble sequence with the target mask. The fourth preamble sequence may be obtained randomly from a set of preamble sequences, or may be obtained from the set of preamble sequences by other means, and the present disclosure is not limited thereto.

The second random access message may be the MSG3 in the two-step random access process.

In some embodiments, the second random access message may be sent by the PUSCH.

In step 1105, the random access is completed based on the second random access message.

In some embodiments, the second random access message further carries the identity of the spatial terminal for the contention resolution. The spatial terminal may initiate a receiving window of the MSG4 on a physical downlink shared channel (PDSCH) in response to sending the second random access message to the network device. In a case of receiving the MSG3, the network device may determine the identity of the spatial terminal initiating the random access and determine whether to allow the spatial terminal to access. In case that the network device allows the spatial terminal to access, the MSG4 carrying the identity of the spatial terminal may be sent to the spatial terminal. In a case where the spatial terminal receives the MSG4 based on the receiving window of the MSG4, and recognizes its own identity in the PDCCH or a downlink shared channel (DL-SCH), the contention resolution is performed, and the random access process is successful and end.

With the random access method provided by embodiments of the present disclosure, the first random access message is sent to the network device by the spatial terminal, where the first random access message carries the first preamble sequence, the first preamble sequence is generated based on the target mask, and the target mask is associated with the height where the spatial terminal is located; the response message from the network device is received, where the response message includes the back-off response message, the response message carries the time advance of the uplink sending timing, and the time advance is obtained based on the first preamble sequence; the uplink sending timing is adjusted based on the time advance; and the second random access message is sent to the network device based on the adjusted uplink sending timing, where the second random access message carries the third preamble sequence, and the third preamble sequence is generated based on the target mask. In this way, the spatial terminal may initiate the random access using the first preamble sequence associated with the height where the spatial terminal is located and complete the random access, thereby avoiding the collision and conflict with the preamble sequences used by the spatial terminals at other heights, improving the success rate of the random access of the spatial terminal, and further improving the efficiency of the random access.

Figure 12:
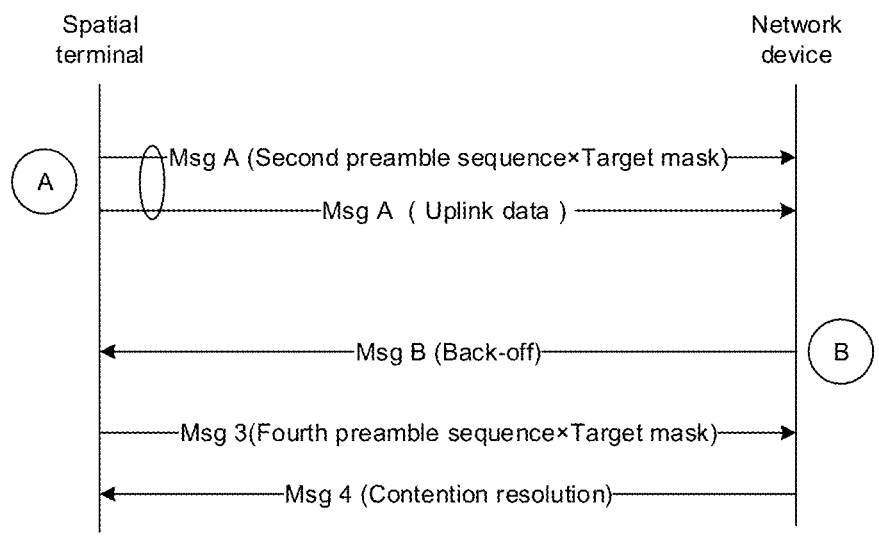
FIG. 12 is a flow diagram illustrating a random access method according to embodiments of the present disclosure.

In some embodiments, referring to FIG. 12, the spatial terminal may send the MSGA to the network device and initiate the receiving window of the MSGB on the PDCCH. The MSGA carries the first preamble sequence and the uplink data. The first preamble sequence is sent to the network device by the PRACH, and the uplink data is sent to the network device by the transmission resource associated with the first preamble sequence on the PUSCH.

The first preamble sequence is obtained by multiplying the second preamble sequence and the target mask, and the target mask is associated with the height where the spatial terminal is located.

In the case where the network device detects the first preamble sequence carried by the MSGA, the second preamble sequence may be obtained based on the first preamble sequence, the time advance of the uplink sending timing of the spatial terminal is calculated based on the second preamble sequence, and the uplink data is decoded on the transmission resource associated with the first preamble sequence. In a case where the decoding is unsuccessful, the network device may determine that the first preamble sequence adopted by the spatial terminal collides with the first preamble sequences adopted by other spatial terminals, and the spatial terminal may not access the network by the first preamble sequence, so that the network device may send the back-off MSGB to the spatial terminal. The back-off MSGB carries the time advance of the uplink sending timing.

In the case where the spatial terminal receives the back-off MSGB based on the receiving window of the MSGB started on the PDCCH, the spatial terminal may adjust the uplink sending timing based on the time advance carried by the back-off MSGB, re-acquire the fourth preamble sequence, obtain the third preamble sequence by multiplying the fourth preamble sequence with the target mask, and then send the MSG3 to the network device based on the adjusted uplink sending timing, and initiate the receiving window of the MSG4 on the PDSCH. The MSG3 carries the third preamble sequence and the identity of the spatial terminal, and may be sent by the PUSCH.

In the case of receiving the MSG3, the network device may determine the identity of the spatial terminal initiating the random access and determine whether to allow the spatial terminal to access. In the case that the network device allows the spatial terminal to access, the MSG4 carrying the identity of the spatial terminal may be sent to the spatial terminal. In the case where the spatial terminal receives the MSG4 based on the receiving window of the MSG4, and recognizes its own identity in the PDCCH or the DL-SCH, the contention resolution is performed, and the random access process is successful and end.

Figure 13:
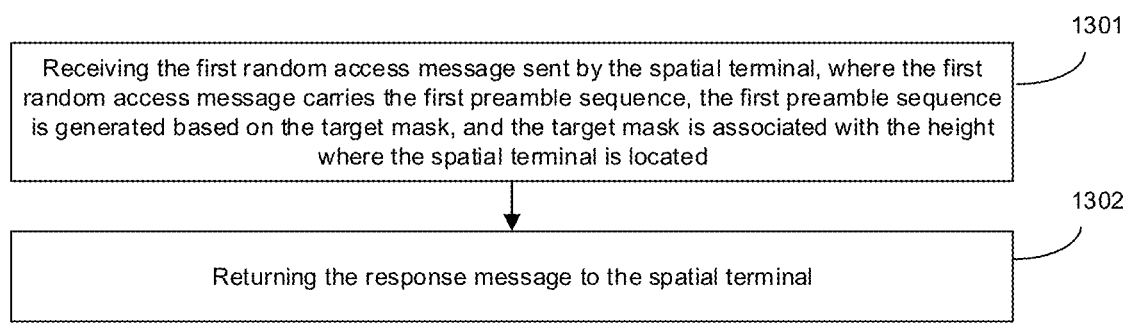
FIG. 13 is a flow diagram illustrating a random access method according to embodiments of the present disclosure.

FIG. 13 is a flow diagram illustrating a random access method according to embodiments of the present disclosure. As shown in FIG. 13, embodiments of the present disclosure relates to a method applied to the spatial terminal, and the method includes the following steps 1301-1302.

In step 1301, the first random access message sent by the spatial terminal is received, where the first random access message carries the first preamble sequence, the first preamble sequence is generated based on the target mask, and the target mask is associated with the height where the spatial terminal is located.

The first random access message, being the message used for initiating the random access, may be the MSG1 in the four-step random access process, may further be the MSGA in the two-step random access process, and may further be the message used for initiating the random access in other random access processes, and the present disclosure is not limited thereto. In the case where the random access method is applicable to the four-step random access process, the first random access message may be the MSG1; and in the case where the random access method is applicable to the two-step random access process, the first random access message may be the MSGA.

It is understood that taking the MSG1 in the four-step random access process and the MSGA in the two-step random access process as an example, the MSG1 and the MSGA carry the preamble sequence of the spatial terminal, which are configured to identify the identity of the UE in the random access. In the process of accessing the network based on the same signaling beam for the spatial terminals at different heights, the collision and conflict with the adopted preamble sequence easily occurs, resulting in the low success rate of the random access and the low efficiency of the random access, so that the spatial terminals may not obtain the communication service in time.

In some embodiments, the masks corresponding to various heights may be arranged, and the spatial terminals at different heights may be assigned the masks corresponding to the respective heights. For example, the mask corresponding to the first height is assigned to the spatial terminal at the first height, and the mask corresponding to the second height is assigned to the spatial terminal at the second height. The first height and the second height are different, and the mask corresponding to the first height and the mask corresponding to the second height may be the same or different.

The multiple heights may be the multiple absolute height values, or the multiple relative height values based on the certain point, or the multiple height ranges obtained by dividing in the height dimension, and the present disclosure is not limited thereto. The first height and the second height may be any two of the multiple heights.

The manner in which the division is made in the height dimension to obtain the multiple height ranges may be predefined. For example, the customized setting may be performed in the manner of dividing the BeiDou grid location code according to the height hierarchy, or based on the type, the distribution characteristic and the traffic type of the spatial terminal of the communication system, and embodiments of the present disclosure are not limited thereto.

The first random access message initiated by the spatial terminal may carry the first preamble sequence generated based on the target mask, where the target mask is the mask corresponding to the height where the spatial terminal is assigned and is associated with the height where the spatial terminal is located, so that the first preamble sequence is taken as the preamble sequence used in the case of initiating the random access.

Since the target mask used by the spatial terminal is associated with the height where the spatial terminal is located, the first preamble sequence generated based on the target mask is further associated with the height where the spatial terminal is located. In the case where the target mask corresponding to the height where the spatial terminal is located is different from masks corresponding to other heights, the first preamble sequence used by the spatial terminal to initiate the random access is different from the preamble sequences used by the spatial terminal at other heights to initiate the random access, thereby avoiding the collision and conflict with the preamble sequence used by the spatial terminal at other heights, improving the success rate of the random access of the spatial terminal, and improving the efficiency of the random access.

In step 1302, the response message is returned to the spatial terminal.

In some embodiments, the response message may be the MSG2 in the four-step random access process.

In some embodiments, the response message may be the MSGB in the two-step random access process.

It is understood that the random access method provided by embodiments of the present disclosure may be applied to the satellite communication system in the scenario where the same beam is used to simultaneously provide the communication services for the terminal device on the ground, in the ocean and in the air within the coverage area thereof, to improve the utilization rate of the beam resources, the flexibility scheduling of the beam resources and the capacity of the communication system. Furthermore, in this scenario, in the process of accessing the network based on the same signaling beam for each terminal device on the ground, in the ocean and in the air, the terminal devices at different heights may initiate the random access by using different preamble sequences, thereby avoiding the collision and conflict with the preamble sequence, improving the success rate of the random access and improving the efficiency of the random access. In this way, various terminal devices may obtain the communication services in time.

Accordingly, with the random access method provided by embodiments of the present disclosure, the first random access message sent by the spatial terminal is received, and the response message is returned to the spatial terminal, where the first random access message carries the first preamble sequence, the first preamble sequence is generated based on the target mask, and the target mask is associated with the height where the spatial terminal is located. In this way, the spatial terminal may initiate the random access using the first preamble sequence associated with the height where the spatial terminal is located, thereby avoiding the collision and conflict with the preamble sequences used by the spatial terminals at other heights, improving the success rate of the random access of the spatial terminal, and further improving the efficiency of the random access.

Figure 14:
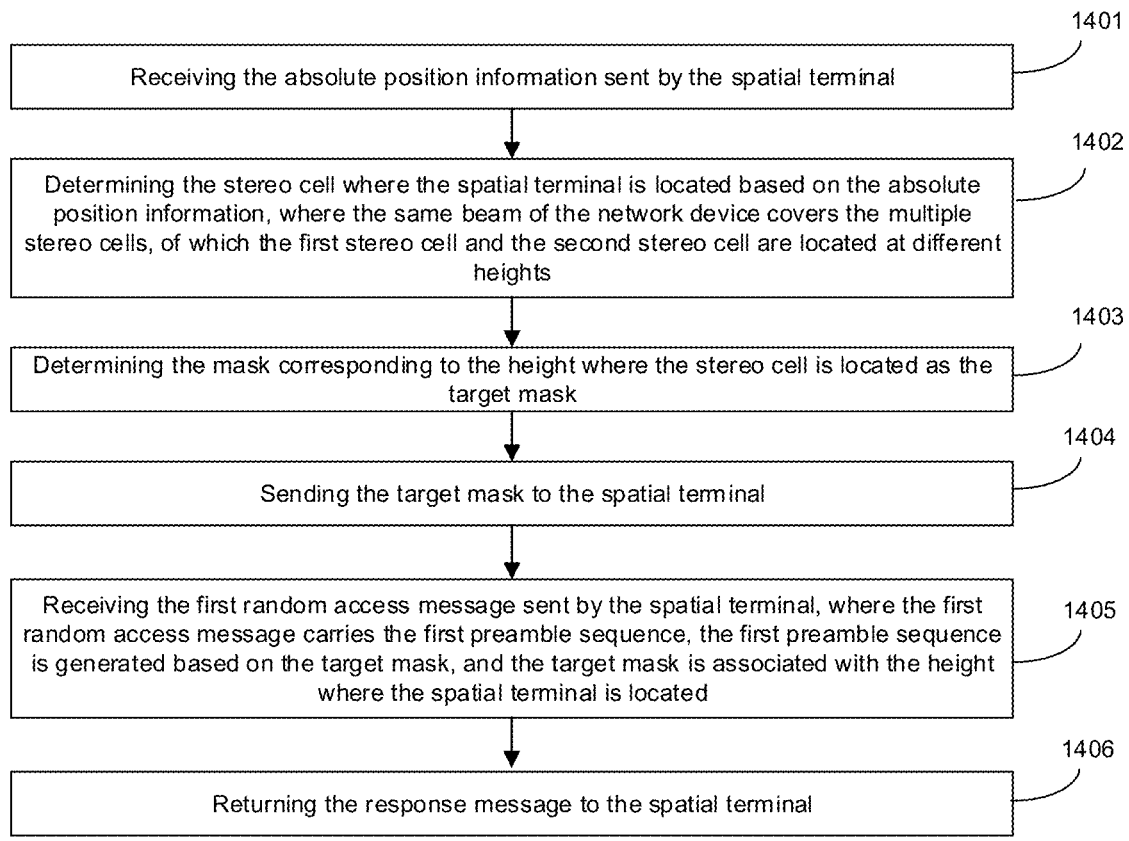
FIG. 14 is a flow diagram illustrating a random access method according to embodiments of the present disclosure.

FIG. 14 is a flow diagram illustrating a random access method according to embodiments of the present disclosure. As shown in FIG. 14, embodiments of the present disclosure relates to a method, applied to the spatial terminal, including the following steps 1401-1406.

In step 1401, the absolute position information sent by the spatial terminal is received.

The absolute position information may include the height information and longitude and latitude information of the spatial terminal. The longitude and latitude information includes longitude information and latitude information.

In some embodiments, the spatial terminal may enhance the payload through the navigation information of the GNSS, obtain the absolute position information thereof, and send the absolute position information to the network device, so that the network device assigns the target mask corresponding to the spatial terminal based on the absolute position information.

In step 1402, the stereo cell where the spatial terminal is located is determined based on the absolute position information, where the same beam of the network device covers the multiple stereo cells, of which the first stereo cell and the second stereo cell are located at different heights.

In step 1403, the mask corresponding to the height where the stereo cell is located is determined as the target mask.

In some embodiments, the three-dimensional space may be divided into the multiple stereo cells, the coverage area of each stereo cell includes the three-dimensional stereo area, the same beam of the network device covers the multiple stereo cells, and the heights of the first stereo cell and the second stereo cell in the multiple stereo cells are different. The manner of dividing the three-dimensional space into the multiple stereo cells may be arranged as required, and the present disclosure is not limited thereto.

The first stereo cell and the second stereo cell are any cells in the multiple stereo cells.

As a possible implementation, the multiple height ranges may be obtained by dividing in the height dimension, and the multiple height ranges may be used as the unified height reference, and based on the unified height reference, the three-dimensional stereo area covered by the same beam of the same network device in the same height range may be used as the stereo cell.

In some embodiments, the mask corresponding to the height where each stereo cell is located may be assigned to each stereo cell according to the height where each stereo cell is located. The assigned masks may be the same or different for any two stereo cells with different heights. The assigned masks may be the same or different for any two stereo cells at the same height.

In some embodiments, the masks assigned to the stereo cells at any first heights of the multiple heights and masks assigned to the stereo cells at any second heights of the multiple heights may be mutually orthogonal or mutually quasi-orthogonal. In this way, regarding the spatial terminal within the stereo cell at the first height and the spatial terminal within the stereo cell at the second height, the collision and conflict with the preamble sequence may be avoided to the maximum extent, thereby improving the success rate of the random access of the spatial terminal, and further improving the efficiency of the random access. For example, the stereo cells at different heights may be assigned the gold code in the CDMA system.

In some embodiments, the network device may determine the stereo cell where the spatial terminal is located from the multiple stereo cells according to the absolute position information of the spatial terminal, and take the mask corresponding to the height where the stereo cell is located as the target mask associated with the height where the spatial terminal is located.

In step 1404, the target mask is sent to the spatial terminal.

In step 1405, the first random access message sent by the spatial terminal is received, where the first random access message carries the first preamble sequence, the first preamble sequence is generated based on the target mask, and the target mask is associated with the height where the spatial terminal is located.

In some embodiments, the first preamble sequence is obtained by multiplying the second preamble sequence and the target mask.

In step 1406, the response message is returned to the spatial terminal.

The specific implementation and principles of steps 1405-1406 may be described with reference to other embodiments and will not be described in detail herein.

With embodiments of the present disclosure, the three-dimensional space are divided into the multiple stereo cells, so that the coverage range of the same beam may be divided more finely. In the case of not considering the height dimension, the stereo cells covered by the same beam will be degenerated into the two-dimensional plane cells, which has the capability of the forward compatibility with the traditional plane cells. Moreover, by using this stereo cell division mode, the spatial terminals at different heights may be divided into different stereo cells, and the same beam is used to serve the spatial terminals at different heights within the coverage range thereof, thereby improving the utilization rate of the beam resources and the flexibility of resource allocation of the communication system, enhancing the service capability of the communication system for the spatial terminals such as the unmanned aerial vehicles, the high-altitude platforms and the low-earth orbiting satellites, and improving the capacity of the communication system. The absolute position information sent by the spatial terminal is received; the stereo cell where the spatial terminal is located is determined form the multiple stereo cells based on the absolute position information; the mask corresponding to the height where the stereo cell is located is determined as the target mask; the target mask is sent to the spatial terminal; the first random access message sent by the spatial terminal is received, where the first random access message carries the first preamble sequence, the first preamble sequence is generated based on the target mask, the target mask is associated with the height where the spatial terminal is located; and the response message is returned to the spatial terminal. In this way, the spatial terminal accesses the network of the network device on the basis of dividing the stereo cell, the spatial terminal may initiate the random access using the first preamble sequence associated with the height where the spatial terminal is located, thereby avoiding the collision and conflict with the preamble sequences used by the spatial terminals at other heights, improving the success rate of the random access of the spatial terminal, and further improving the efficiency of the random access. Furthermore, the target mask is determined by the network device and is sent to the spatial terminal, so that the storage space of the spatial terminal may be saved.

Figure 15:
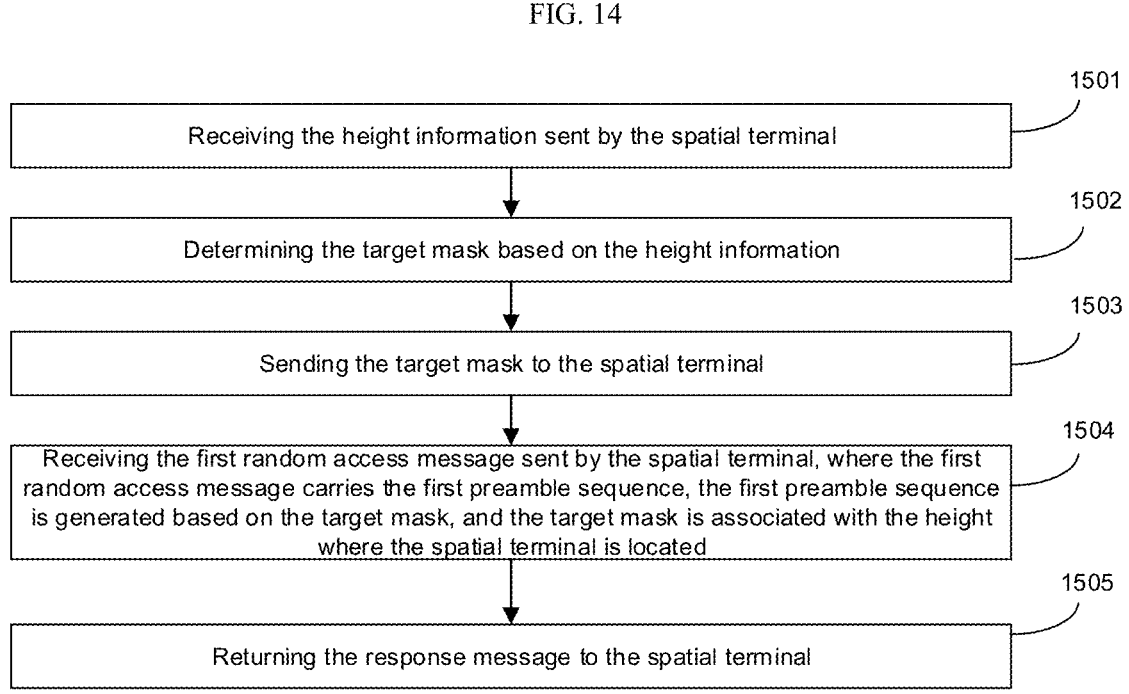
FIG. 15 is a flow diagram illustrating a random access method according to embodiments of the present disclosure.

FIG. 15 is a flow diagram illustrating a random access method according to embodiments of the present disclosure. As shown in FIG. 15, embodiments of the present disclosure relates to a method, applied to the spatial terminal, including the following steps 1501-1505.

In step 1501, the height information sent by the spatial terminal is received.

In some embodiments, the spatial terminal may enhance the payload through the navigation information of the GNSS, obtain the height information thereof, and send the height information to the network device, so that the network device assigns the target mask corresponding to the spatial terminal based on the height information.

In step 1502, the target mask is determined based on the height information.

In some embodiments, the masks corresponding to various heights may be arranged, and the network device may determine the height where the spatial terminal is located according to the height information about the spatial terminal, and take the mask corresponding to the height where the spatial terminal is located as the target mask.

In some embodiments, the masks corresponding to any first height of the multiple heights, and the masks corresponding to any second height of the multiple heights, may be correlated to be mutually orthogonal or mutually quasi-orthogonal. The manner in which the masks corresponding to various heights are arranged may be referred to other embodiments, and the description thereof will not be repeated here.

In step 1503, the target mask is sent to the spatial terminal.

In step 1504, the first random access message sent by the spatial terminal is received, where the first random access message carries the first preamble sequence, the first preamble sequence is generated based on the target mask, and the target mask is associated with the height where the spatial terminal is located.

In some embodiments, the first preamble sequence may be obtained by multiplying the second preamble sequence and the target mask.

In step 1505, the response message is returned to the spatial terminal.

With embodiments of the present disclosure, the height information sent by the spatial terminal is received; the target mask is determined based on the height information; the target mask is sent to the spatial terminal; the first random access message sent by the spatial terminal is received, where the first random access message carries the first preamble sequence, the first preamble sequence is generated based on the target mask, and the target mask is associated with the height where the spatial terminal is located; and the response message is returned to the spatial terminal. In this way, the spatial terminal may initiate the random access using the first preamble sequence associated with the height where the spatial terminal is located, thereby avoiding the collision and conflict with the preamble sequences used by the spatial terminals at other heights, improving the success rate of the random access of the spatial terminal, and further improving the efficiency of the random access. Furthermore, the target mask is determined by the network device and is sent to the spatial terminal, so that the storage space of the spatial terminal may be saved.

The random access method shown in embodiments of the present disclosure is described below with reference to the two-step random access process as an example, where the random access method is applied to the two-step random access process. The implementation process is the scenario where one random access is successful.

Figure 16:
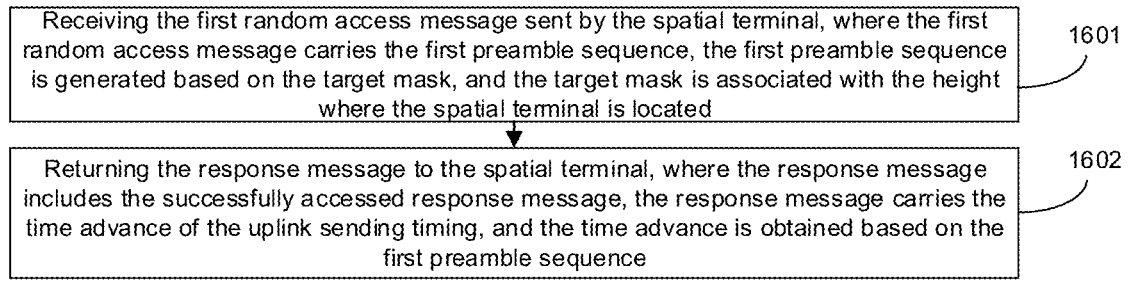
FIG. 16 is a flow diagram illustrating a random access method according to embodiments of the present disclosure.

FIG. 16 is a flow diagram illustrating a random access method according to embodiments of the present disclosure. As shown in FIG. 16, embodiments of the present disclosure relates to a method, applied to the spatial terminal, including the following steps 1601-1602.

In step 1601, the first random access message sent by the spatial terminal is received, where the first random access message carries the first preamble sequence, the first preamble sequence is generated based on the target mask, and the target mask is associated with the height where the spatial terminal is located.

The first random access message, which is the message for initiating the random access, may be the MSGA in the two-step random access process.

The first random access message carries two parts of content, one being the first preamble sequence generated based on the target mask, and the other being the uplink data. In some embodiments, the network device may receive the first preamble sequence over the PRACH and may receive the uplink data over the transmission resource associated with the first preamble sequence on the PUSCH.

In some embodiments, the first preamble sequence is obtained by multiplying the second preamble sequence and the target mask.

In step 1602, the response message is returned to the spatial terminal, where the response message includes the successfully accessed response message, the response message carries the time advance of the uplink sending timing, and the time advance is obtained based on the first preamble sequence.

In some embodiments, the network device detects the first preamble sequence carried in the first random access message, and may calculate the time advance of the uplink sending timing of the spatial terminal based on the first preamble sequence, and decode the uplink data on the transmission resource associated with the first preamble sequence. In some embodiments, the network device may derive the second preamble sequence based on the first preamble sequence and calculate the timing advance based on the second preamble sequence.

In the case where the network device successfully decodes the uplink data on the transmission resource associated with the first preamble sequence, the network device may determine that the first preamble sequence adopted by the spatial terminal does not collide with the preamble sequences adopted by other spatial terminals, and the spatial terminal may access the network by the first preamble sequence, so that the network device may send the successfully accessed response message to the spatial terminal.

The successfully accessed response message may be the successfully accessed MSGB in the two-step random access process.

The successfully accessed response message carries the time advance of the uplink sending timing, and the time advance is configured for the spatial terminal to adjust the uplink sending timing.

The successfully accessed response message may include the first indication information, and the first indication information indicates that the response message is the successfully accessed response message.

In some embodiments, the uplink data sent by the spatial terminal further carries the identity of the spatial terminal for the contention resolution. In the case where the network device successfully decodes the uplink data on the transmission resource associated with the first preamble sequence, the network device may carry the identity in the successfully accessed response message and send the identity to the spatial terminal.

In some embodiments, the successfully accessed response message may be sent to the spatial terminal by the PDCCH.

In some embodiments, the spatial terminal may initiate the receiving window of the MSGB on the PDCCH in response to sending the first random access message to the network device, and the random access process is successful and ends in the case that the spatial terminal receives the successfully accessed MSGB based on the receiving window.

With the random access method provided by embodiments of the present disclosure, the network device may receive the first random access message sent by the spatial terminal, where the first random access message carries the first preamble sequence, the first preamble sequence is generated based on the target mask, and the target mask is associated with the height where the spatial terminal is located; and the response message is returned to the spatial terminal, where the response message includes the successfully accessed response message, the response message carries the time advance of the uplink sending timing, and the time advance is obtained based on the first preamble sequence. In this way, the spatial terminal may initiate the random access using the first preamble sequence associated with the height where the spatial terminal is located and complete the random access, thereby avoiding the collision and conflict with the preamble sequences used by the spatial terminals at other heights, improving the success rate of the random access of the spatial terminal, and further improving the efficiency of the random access.

The random access method shown in embodiments of the present disclosure is described below with reference to the two-step random access process as an example, where the random access method is applied to the two-step random access process. The implementation process is a scenario of one random access backoff.

Figure 17:
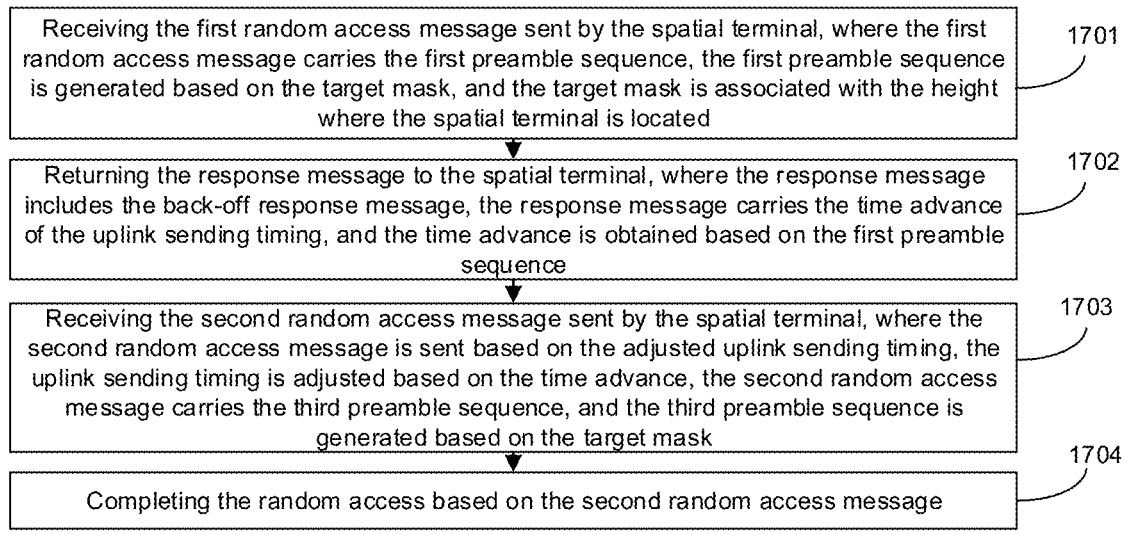
FIG. 17 is a flow diagram illustrating a random access method according to embodiments of the present disclosure.

FIG. 17 is a flow diagram illustrating a random access method according to embodiments of the present disclosure. As shown in FIG. 17, embodiments of the present disclosure relates to a method, applied to the spatial terminal, including the following steps 1701-1704.

In step 1701, the first random access message sent by the spatial terminal is received, where the first random access message carries the first preamble sequence, the first preamble sequence is generated based on the target mask, and the target mask is associated with the height where the spatial terminal is located.

The first random access message, which is the message for initiating the random access, may be the MSGA in the two-step random access process.

The first random access message carries two parts of content, one being the first preamble sequence generated based on the target mask, and the other being the uplink data. In some embodiments, the network device may receive the first preamble sequence over the PRACH and may receive the uplink data over the transmission resource associated with the first preamble sequence on the PUSCH.

In some embodiments, the first preamble sequence is obtained by multiplying the second preamble sequence and the target mask.

In step 1702, the response message is returned to the spatial terminal, where the response message includes the back-off response message, the response message carries the time advance of the uplink sending timing, and the time advance is obtained based on the first preamble sequence.

In some embodiments, the network device detects the first preamble sequence carried in the first random access message, and may calculate the time advance of the uplink sending timing of the spatial terminal based on the first preamble sequence, and decode the uplink data on the transmission resource associated with the first preamble sequence. In some embodiments, the network device may derive the second preamble sequence based on the first preamble sequence and calculate the timing advance based on the second preamble sequence.

In the case where the network device unsuccessfully decodes the uplink data on the transmission resource associated with the first preamble sequence, the network device may determine that the first preamble sequence adopted by the spatial terminal collides with the preamble sequences adopted by other spatial terminals, and the spatial terminal may not access the network by the first preamble sequence, so that the network device may send the back-off response message to the spatial terminal.

The back-off response message may be the back-off MSGB in the two-step random access process.

The back-off response message may include the second indication information, and the second indication information indicates that the response message is the back-off response message.

In some embodiments, the uplink data sent by the spatial terminal further carries the identity of the spatial terminal for the contention resolution. In the case where the network device unsuccessfully decodes the uplink data on the transmission resource associated with the first preamble sequence, the identity carried in the back-off response message does not match the identity of the spatial terminal.

In some embodiments, the back-off response message may be sent to the spatial terminal by the PDCCH.

In step 1703, the second random access message sent by the spatial terminal is received, where the second random access message is sent based on the adjusted uplink sending timing, the uplink sending timing is adjusted based on the time advance, the second random access message carries the third preamble sequence, and the third preamble sequence is generated based on the target mask.

In step 1704, the random access is completed based on the second random access message.

In some embodiments, the spatial terminal may initiate the receiving window of the MSGB on the PDCCH in response to sending the first random access message to the network device. In the case where the spatial terminal receives the back-off MSGB based on the receiving window, the uplink sending timing may be adjusted based on the time advance carried by the back-off MSGB, and the third preamble sequence may be re-acquired. Further based on the adjusted uplink sending timing, the second random access message carrying the third preamble sequence is sent to the network device.

The third preamble sequence may be obtained by multiplying the fourth preamble sequence with the target mask. The fourth preamble sequence may be obtained randomly from the set of preamble sequences, or may be obtained from the set of preamble sequences by other means, and the present disclosure is not limited thereto.

The second random access message may be the MSG3 in the two-step random access process.

In some embodiments, the network device may receive the second random access message over the PUSCH.

In some embodiments, the second random access message further carries the identity of the spatial terminal for the contention resolution. The spatial terminal may initiate the receiving window of the MSG4 on the PDSCH in response to sending the second random access message to the network device. In the case of receiving the MSG3, the network device may determine the identity of the spatial terminal initiating the random access and determine whether to allow access to the spatial terminal. In case that the network device allows access to the spatial terminal, the MSG4 carrying the identity of the spatial terminal may be sent to the spatial terminal. In the case where the spatial terminal receives the MSG4 based on the receiving window of the MSG4, and recognizes its own identity in the PDCCH or the DL-SCH, the contention resolution is performed, and the random access process is successful and end.

With the random access method provided by embodiments of the present disclosure, the network device may receive the first random access message sent by the spatial terminal, where the first random access message carries the first preamble sequence, the first preamble sequence is generated based on the target mask, and the target mask is associated with the height where the spatial terminal is located; the response message is returned to the spatial terminal, where the response message includes the back-off response message, the response message carries the time advance of the uplink sending timing, and the time advance is obtained based on the first preamble sequence; the second random access message sent by the spatial terminal is received, where the second random access message is sent based on the adjusted uplink sending timing, the uplink sending timing is adjusted based on the time advance, the second random access message carries the third preamble sequence, and the third preamble sequence is generated based on the target mask; and the random access is completed based on the second random access message. In this way, the spatial terminal may initiate the random access using the first preamble sequence associated with the height where the spatial terminal is located and complete the random access, thereby avoiding the collision and conflict with the preamble sequences used by the spatial terminals at other heights, improving the success rate of the random access of the spatial terminal, and further improving the efficiency of the random access.

Embodiments of the present disclosure further provide a device for implementing any of the above methods, for example, a device that includes a unit or module to implement the steps performed by the spatial terminal in any of the above methods. For another example, another device is provided that includes a unit or module to implement the steps performed by the network devices (e.g. a satellite, an access network device, a core network functional node, a core network device, etc.) in any of the above methods.

It should be understood that a division of units or modules in the above device is merely a division of logical functions, and may be integrated in whole or in part into one physical entity or may be physically separated in actual implementation. In addition, the units or modules in the device may be implemented in a form of processor calling software: for example, the device includes a processor, e.g. a general-purpose processor such as a central processing unit (CPU) or a microprocessor, coupled to a memory, e.g. internal or external to the device, the processor invoking instructions stored in the memory to implement any of the methods described above or to implement the functions of various units or modules of the device described above. Alternatively, the units or modules of the device may be implemented in a form of hardware circuit, which may be understood as one or more processors, and function of some or all of the units or modules may be implemented by designing the hardware circuit. For example, in one implementation, the above-mentioned hardware circuit is an application-specific integrated circuit (ASIC), and the function of some or all of the above-mentioned units or modules is realized through design of logical relationships of elements in the circuit. As another example, in another implementation, the above-mentioned hardware circuit may be implemented by a programmable logic device (PLD), and for example, a field programmable gate array (FPGA) may include a large number of logic gates, and the connection relationship between the logic gates is configured by a configuration file to realize the functions of some or all of the above units or modules. All the units or modules of the above device may be implemented entirely in a form of calling the software by the processor, or entirely in the form of hardware circuit, or partly in the form of calling the software by the processor, and the remainder in the form of hardware circuit.

In embodiments of the present disclosure, the processor is a circuit having a signal processing capability. In one implementation, the processor may be a circuit having instruction fetch and run capabilities, such as the CPU, the microprocessor, a graphics processing unit (GPU) (which may be understood to be the microprocessor), or a digital signal processor (DSP), etc. In another implementation, the processor may implement a function through a logical relationship of hardware circuit that is fixed or reconfigurable. For example, the processor is the hardware circuit implemented as the ASIC or the PLD, such as the FPGA. In a reconfigurable hardware circuit, a process of the processor loading a configuration document to implement configuration of the hardware circuit may be understood as a process of the processor loading the instructions to implement some or all of the functions of the units or modules above. Furthermore, the processor may further be a hardware circuit designed for artificial intelligence, which may be understood as the ASIC, such as a neural network processing unit (NPU), a tensor processing unit (TPU), a deep learning processing unit (Unit, DPU), etc.

Figure 18:
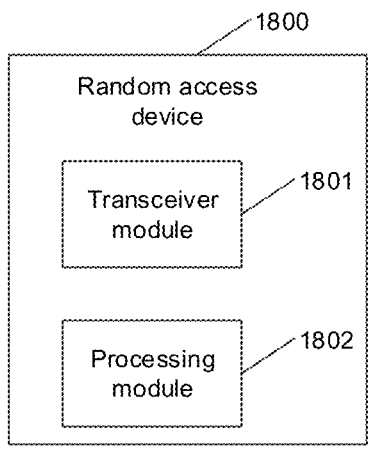
FIG. 18 is a structural diagram illustrating a random access device according to embodiments of the present disclosure.

FIG. 18 is a structural diagram illustrating a random access device according to embodiments of the present disclosure. The random access device may be applied to the spatial terminal. As shown in FIG. 18, the random access device 1800 may include: at least one of a transceiver module 1801 or a processing module 1802.

In some embodiments, the transceiver module 1801 is configured to send the first random access message to the network device, where the first random access message carries the first preamble sequence, the first preamble sequence is generated based on the target mask, and the target mask is associated with the height where the spatial terminal is located; and the transceiver module is further configured to receive the response message from the network device.

In some embodiments, the first preamble sequence is obtained by multiplying the second preamble sequence and the target mask.

In some embodiments, the masks corresponding to the first height and the second height are mutually orthogonal or mutually quasi-orthogonal.

In some embodiments, the same beam of the network device covers the multiple stereo cells, of which the first stereo cell and the second stereo cell are located at different heights.

In some embodiments, the transceiver module 1801 is configured to send the absolute position information to the network device, where the absolute position information is configured to determine the stereo cell where the spatial terminal is located, and determine the mask corresponding to the height where the stereo cell is located as the target mask; and the transceiver module 1801 is configured to receive the target mask sent by the network device.

In some embodiments, the transceiver module 1801 is configured to send the height information to the network device, where the height information is configured to determine the target mask; and the transceiver module 1801 is configured to receive the target mask sent by the network device.

In some embodiments, the random access device 1800 may further include: an obtaining module, configured to obtain the target mask from the masks corresponding to various heights stored in advance in the spatial terminal.

In some embodiments, the response message includes the successfully accessed response message, the response message carries the time advance of the uplink sending timing, and the time advance is obtained based on the first preamble sequence.

In some embodiments, the response message includes the back-off response message, the response message carries the time advance of the uplink sending timing, and the time advance is obtained based on the first preamble sequence. Accordingly, the processing module 1802 is configured to adjust the uplink sending timing based on the time advance; the transceiver module 1801 is configured to send the second random access message to the network device based on the adjusted uplink sending timing, where the second random access message carries the third preamble sequence, and the third preamble sequence is generated based on the target mask; and the processing module 1802 is configured to complete the random access based on the second random access message.

Figure 19:
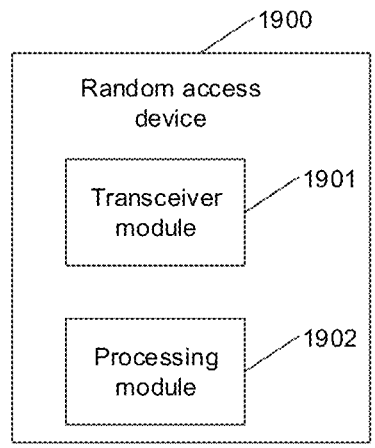
FIG. 19 is a structural diagram illustrating a random access device according to embodiments of the present disclosure.

FIG. 19 is a structural diagram illustrating a random access device according to embodiments of the present disclosure. The random access device may be applied to the spatial terminal. As shown in FIG. 19, the random access device 1900 may include: at least one of a transceiver module 1901 or a processing module 1902.

In some embodiments, the transceiver module 1901 is configured to receive the first random access message sent by the spatial terminal, where the first random access message carries the first preamble sequence, the first preamble sequence is generated based on the target mask, and the target mask is associated with the height where the spatial terminal is located; and the transceiver module 1901 is further configured to return the response message to the spatial terminal.

In some embodiments, the first preamble sequence is obtained by multiplying the second preamble sequence and the target mask.

In some embodiments, the masks corresponding to the first height and the second height are mutually orthogonal or mutually quasi-orthogonal.

In some embodiments, the same beam of the network device covers the multiple stereo cells, of which the first stereo cell and the second stereo cell are located at different heights.

In some embodiments, the transceiver module 1901 is configured to receive the absolute position information sent by the spatial terminal; the processing module 1902 is configured to determine the stereo cell where the spatial terminal is located based on the absolute position information, and determine the mask corresponding to the height where the stereo cell is located as the target mask; and the transceiver module 1901 is configured to send the target mask to the spatial terminal.

In some embodiments, the transceiver module 1901 is configured to receive the height information sent by the network device; the processing module 1902 is configured to determining the target mask based on the height information; and the transceiver module 1901 is configured to send the target mask to the spatial terminal.

In some embodiments, the response message includes the successfully accessed response message, the response message carries the time advance of the uplink sending timing, and the time advance is obtained based on the first preamble sequence.

In some embodiments, the response message includes the back-off response message, the response message carries the time advance of the uplink sending timing, and the time advance is obtained based on the first preamble sequence. Accordingly, the transceiver module 1901 is configured to receive the second random access message sent by the spatial terminal, where the second random access message is sent based on the adjusted uplink sending timing, the uplink sending timing is adjusted based on the time advance, the second random access message carries the third preamble sequence, and the third preamble sequence is generated based on the target mask; and the processing module 1902 is configured to complete the random access based on the second random access message.

Figure 20:
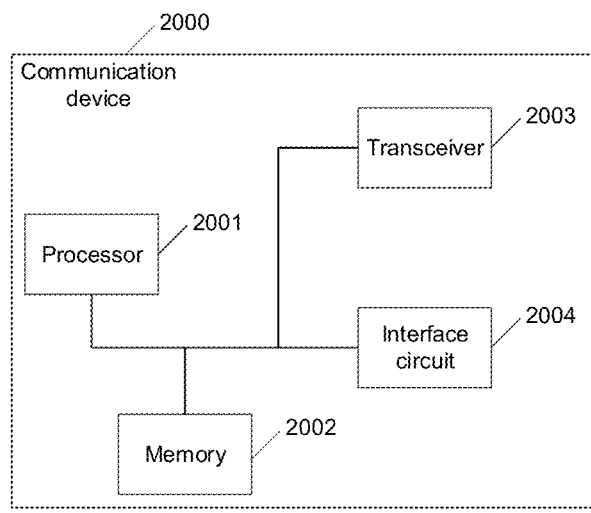
FIG. 20 is a structural diagram illustrating a communication device according to embodiments of the present disclosure.

FIG. 20 is a structural diagram illustrating a communication device 2000 according to embodiments of the present disclosure. The communication device 2000 may be the network device (such as the satellite, the access network device, the core network device, etc.), the spatial terminal (such as the mobile phone, etc.), or a chip, a chip system or a processor supporting the network device to implement the above-mentioned method, or a chip, a chip system or a processor supporting the spatial terminal to implement the above-mentioned method. The communication device 2000 may be configured to implement the method as described in any of the method embodiments described above, with particular reference to the description of the method embodiments described above.

As shown in FIG. 20, the communication device 2000 includes one or more processors 2001. The processor 2001 may be the general-purpose processor or a special-purpose processor, etc., for example, a baseband processor or a central processor. The baseband processor may be configured to process a communication protocol and communication data, and the central processor may be configured to control the communication device (such as the base station, a baseband chip, a terminal, a terminal chip, a distributed unit (DU) or a central unit (CU), etc.), execute a program and process data of the program. The processor 2001 is configured to invoke the instructions to enable the communication device 2000 to perform any of the above methods.

In some embodiments, the communication device 2000 further includes one or more memories 2002 for storing the instructions. In some embodiments, all or part of memory 2002 may further be external to the communication device 2000.

In some embodiments, the communication device 2000 further includes one or more transceivers 2003. In case that the communication device 2000 includes one or more transceivers 2003, communication steps of the method described above, such as sending and receiving, are performed by the transceiver 2003, and the other steps are performed by the processor 2001.

In some embodiments, the transceiver 2003 may include a receiver and a transmitter, which may be separate or integrated. In some embodiments, terms transceiver, transceiving unit, transceiver, transceiving circuit, etc. may be substituted for each other, terms transmitter, transmitting unit, transmitter, transmitting circuit, etc. may be substituted for each other, and terms receiver, receiving unit, receiver, receiving circuit, etc. may be substituted for each other.

In some embodiments, the communication device 2000 further includes one or more interface circuits 2004 coupled to the memory 2002, the interface circuits 2004 is configured to receive signals from the memory 2002 or other devices and configured to transmit the signals to the memory 2002 or other devices. For example, the interface circuit 2004 may read the instructions stored in the memory 2002 and send the instructions to the processor 2001.

The communication device 2000 in the above embodiments may be the network device or the spatial terminal, but scope of the communication device 2000 described in the present disclosure is not limited thereto. The structure of the communication device 2000 may not be limited by FIG. 20. The communication device may be a stand-alone device or may be a part of a larger device. For example, the communication device may be: (1) a stand-alone integrated circuit (IC), or a chip, or a chip system or a subsystem; (2) a set of one or more ICs, optionally the set of ICs may further include a storage component for storing the data and the computer program; (3) ASIC such as modem; (4) modules that may be embedded in other devices; (5) a receiver, a terminal device, an intelligent terminal device, a cellular phone, a wireless device, a handset, a mobile unit, an on-vehicle device, a network device, a cloud device, an artificial intelligence device, etc.; (6) others.

Figure 21:
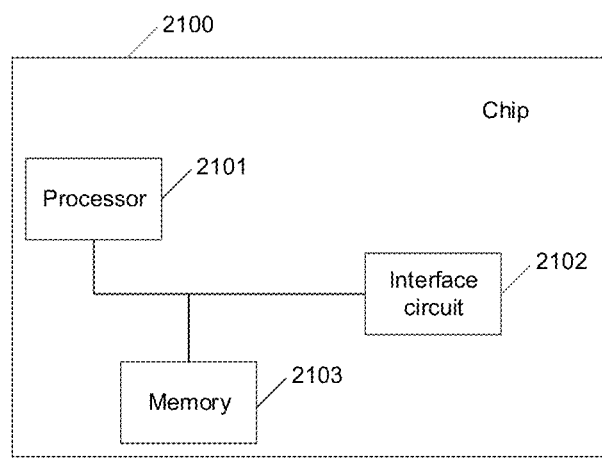
FIG. 21 is a schematic diagram illustrating a structure of a chip according to embodiments of the present disclosure.

FIG. 21 is a schematic diagram illustrating a structure of a chip according to embodiments of the present disclosure. Regarding a case where the communication device 2000 may be the chip or the chip system, reference may be made to the structural diagram of a chip 2100 shown in FIG. 21, but is not limited thereto.

The chip 2100 includes one or more processors 2101 for invoking the instructions to enable the chip 2100 to perform any of the above methods.

In some embodiments, the chip 2100 further includes one or more interface circuits 2102 coupled to a memory 2103, the interface circuits 2102 may be configured to receive the signals from the memory 2103 or other devices, and the interface circuits 2102 may be configured to send the signals to the memory 2103 or other devices. For example, the interface circuits 2102 may read the instructions stored in the memory 2103 and send the instructions to the processor

2101. In some embodiments, terms interface circuit, interface, transceiver pin, transceiver, etc. may be substituted for each other.

In some embodiments, the chip 2100 further includes one or more memories 2103 for storing the instructions. In some embodiments, all or part of the memory 2103 may be external to the chip 2100.

The present disclosure further provides the communication system including: the spatial terminal and the network device, where the spatial terminal is configured to perform the method as described in the first aspect or the alternative implementation of the first aspect and the network device is configured to perform the method as described in the second aspect or the alternative implementation of the second aspect.

The present disclosure further provides the storage medium having stored thereon the instructions that, when executed on the communication device 2000, enable the communication device 2000 to perform any of the above methods. In some embodiments, the storage medium is an electronic storage medium. In some embodiments, the storage medium described above is a computer-readable storage medium, but is not limited thereto, and may be a storage medium readable by other apparatuses. In some embodiments, the storage medium may be, but is not limited to, a non-transitory storage medium, and may further be a transitory storage medium.

The present disclosure further provides the program product that, when executed by the communication device 2000, enables the communication device 2000 to perform any of the above methods. In some embodiments, the program product is the computer program product.

The present disclosure further provides the computer program that, when executed on the computer, enables the computer to perform any of the above methods.

It is understood that the above described random access device, spatial terminal, network device, communication system, storage medium, program product, computer program are all for performing the method provided by embodiments of the present disclosure. Therefore, advantageous effects thereof may be obtained by referring to advantageous effects in the corresponding method, and the description thereof will not be repeated here.

In some embodiments, terms such as random access method and information processing method, communication method, etc. may be substituted for each other, terms such as random access device and information processing device, communication device, etc. may be substituted for each other, and terms such as information processing system, communication system, etc. may be substituted for each other.

Embodiments of the present disclosure are not exhaustive, but only illustrative of some embodiments, and do not specifically limit the scope of the present disclosure. In case of no contradiction, each step in a certain embodiment may be implemented as an independent embodiment, and the steps may be arbitrarily combined. For example, in a certain embodiment, a solution after removing part of the steps may further be implemented as the independent embodiment, and the order of the steps in a certain embodiment may be arbitrarily exchanged. Moreover, alternative implementations in a certain embodiment may be arbitrarily combined. Furthermore, various embodiments may be arbitrarily combined, e.g. some or all of the steps of different embodiments may be arbitrarily combined, and a certain embodiment may be combined in any combination with alternative implementations of other embodiments.

In the various embodiments of the present disclosure, the terms and/or descriptions used in the various embodiments are consistent with each other and may be referred to each other without specific recitation or logical conflict, and technical features in different embodiments may be combined to form new embodiments according to their inherent logical relationships.

The terms used in embodiments of the present disclosure is for a purpose of describing particular embodiments only and is not intended to be limiting of the present disclosure.

In embodiments of the present disclosure, unless otherwise specified, elements expressed in singular, such as "a", "an", "the", "above", "said", "preceding", "the", etc., may mean "one and only one", and may further mean "one or more", "at least one" and the like. For example, in a case where an article such as "a", "an", "the" or the like is used in translation, the article-following noun may be understood as a singular expression or a plural expression.

In embodiments of the present disclosure, "multiple" means two or more.

In some embodiments, a description mode such as "A" or "B" may include the following technical solutions according to circumstances: in some embodiments A (A is performed independently of B); in some embodiments B (B is performed independently of A); in some embodiments, execution is selected from A and B (A and B are selectively executed). This is also true when there are more branches such as A, B, C.

Prefixes such as "first", "second" and the like in embodiments of the present disclosure are merely used for distinguishing different description objects and do not constitute a limitation on position, order, priority, number or content of the description objects, and statement on the description objects shall refer to the context in the claims or embodiments, and shall not constitute an unnecessary limitation due to the use of the prefixes. For example, in case that the description object is "field", an ordinal word preceding the "field" in a "first field" and a "second field" does not limit position or order between the "fields", and the "first" and the "second" do not limit whether the "fields" modified thereby are in the same message, nor do they limit the order of the "first field" and the "second field". As another example, in case that the description object is "level", the ordinal word preceding the "level" in a "first level" and a "second level" does not limit the priority between the "levels". As another example, the number of description objects is not limited by ordinal terms, and may be one or more, for example, a "first device", where the number of "devices" may be one or more. In addition, objects modified by different prefixes may be the same or different. For example, in case that the description object is the "device", the "first device" and a "second device" may be the same device or different devices, and the types thereof may be the same or different. As another example, in case that the description object is "information", "first information" and "second information" may be the same information or different information, and the contents thereof may be the same or different.

In some embodiments, "comprising E", "including E", "configured to indicate E", "carrying E", may be interpreted as either directly carrying E or indirectly indicating E.

In some embodiments, terms "greater than", "greater than or equal to", "no less than", "more than", "more than or equal to", "no less than", "higher than", "higher than or equal to", "no less than", "above", and the like may be substituted for each other, terms "less than", "less than or equal to", "no greater than", "less than", "less than or equal to", "no more than", "less than", "less than or equal to", "no greater than", "below" and the like may be substituted for each other.

In some embodiments, the apparatus and the like may be interpreted as physical or virtual, and names thereof are not limited to names described in embodiments, and terms "apparatus", "equipment", "device", "circuit", "network element", "node", "function", "unit", "section", "system", "network", "chip", "chip system", "entity", "subject" and the like may be substituted for each other.

In some embodiments, the "network" may be interpreted as an apparatus included in the network (e.g. the access network device, the core network device, etc.).

In some embodiments, terms "access network device (AN device)", "radio access network device (RAN device)", "base station (BS)", "radio base station", "fixed station", "node", "access point", "transmission point (TP)", "reception point (RP)", "transmission/reception point (TRP)", "panel", "antenna panel", "antenna array", "cell", "macro cell", "small cell", "femto cell", "pico cell", "sector", "cell group", "serving cell", "carrier", "component carrier", "bandwidth part (BWP)" and the like may be substituted for each other.

In some embodiments, terms "terminal", "terminal device", "user equipment (UE)", "user terminal", "mobile station (MS)", "mobile terminal (MT)", "subscriber station", "mobile unit", "subscriber unit", "wireless unit", "remote unit", "mobile device", "wireless device", "wireless communication device", "remote device", "mobile subscriber station", "access terminal", "mobile terminal", "wireless terminal", "remote terminal", "handset", "user agent", "mobile client", "client" and the like may be substituted for each other.

In some embodiments, the access network device, core network device, or network device may be replaced with the terminal. For example, embodiments of the present disclosure may further be applied to architectures that replace communications between access network devices, core network devices, or network devices and terminals with communications between multiple terminals (e.g. device-to-device (D2D), vehicle-to-everything (V2X), etc.). In this case, it is further possible to set a structure in which the terminal has all or part of the functions possessed by the access network device. Furthermore, terms such as "upstream", "downstream" and the like may further be replaced with terms corresponding to inter-terminal communication (e.g. "side"). For example, an up channel, a down channel and the like may be replaced with a side channel, and an up link, a down link and the like may be replaced with a side link.

In some embodiments, the terminal may be replaced with the access network device, the core network device, or the network device. In this case, it is further possible that the access network device, the core network device, or the network device has a structure having all or part of the functions possessed by the terminal.

In some embodiments, the data, information, etc. may be obtained in compliance with local country laws and regulations.

In some embodiments, the data, information, etc. may be obtained upon the consent of the user.

In the above embodiments, the present disclosure may be implemented in whole or in part by the hardware, software, firmware or their combination. When implemented in the software, the present disclosure may be implemented in whole or in part as the computer program product. The computer program product includes one or more computer programs. The computer programs, when loaded and executed on the computer, result in whole or in part in processes or functions according to embodiments of the present disclosure. The computer may be a general-purpose computer, a special-purpose computer, a computer network, or other programmable devices. The computer program may be stored in a computer-readable storage medium or transmitted from one computer-readable storage medium to another, for example, the computer program may be transmitted from one website, computer, server, or data center to another website, computer, server, or data center by wire (e.g. coaxial cable, fiber optic, digital subscriber line (DSL)) or wirelessly (e.g. infrared, wireless, microwave, etc.). The computer-readable storage medium may be any available medium that may be accessed by the computer or a data storage device, such as a server, a data center, etc., that includes one or more available media. The available medium may be a magnetic medium (e.g. a floppy disk, a hard disk, a magnetic tape), an optical medium (e.g. a high-density digital video disc (DVD)), or a semiconductor medium (e.g. a solid state disk (SSD)), etc.

Those skilled in the art may appreciate that units and algorithm steps of each example described in conjunction with embodiments disclosed herein may be implemented with the electronic hardware, or combinations of the computer software and the electronic hardware. Whether such functionality is implemented in hardware or software depends on the specific application and design constraints of the technical solution. Those skilled in the art may implement the described functionality in varying ways for each particular application, but such implementation should not be considered to be beyond the scope of the present disclosure.

It will be clear to those skilled in the art that, for convenience and brevity of the description, specific working procedures of the above described systems, devices and units may be referred to corresponding procedures in the preceding method embodiments and will not be described in detail here.

The above description is only for the specific embodiments of the present disclosure, but the scope of the present disclosure is not limited thereto. Any person skilled in the art may easily think of changes or substitutions within the technical scope of the present disclosure, which shall be covered by the protection scope of the present disclosure. Therefore, the protection scope of the present application shall be in line with the attached claims.

What is claimed is:

1. A random access method, comprising:
   sending a first random access message to a network device, wherein the first random access message carries a first preamble sequence, the first preamble sequence is generated based on a target mask, and the target mask is associated with a height where a spatial terminal is located; and
   receiving a response message from the network device.

2. The method of claim 1, wherein the first preamble sequence is obtained by multiplying a second preamble sequence and the target mask.

3. The method of claim 1, wherein masks corresponding to a first height and a second height are mutually orthogonal or mutually quasi-orthogonal.

4. The method of claim 1, wherein a same beam of the network device covers a plurality of stereo cells, of which a first stereo cell and a second stereo cell are located at different heights.

5. The method of claim 4, wherein the method further comprises:
sending absolute position information to the network device, wherein the absolute position information is configured to determine a stereo cell where the spatial terminal is located, and determine a mask corresponding to a height where the stereo cell is located as the target mask; and
receiving the target mask sent by the network device.

6. The method of claim 1, wherein the method further comprises:
sending height information to the network device, wherein the height information is configured to determine the target mask; and
receiving the target mask sent by the network device.

7. The method of claim 1, wherein the method further comprises:
obtaining the target mask from masks corresponding to various heights stored in advance in the spatial terminal.

8. The method of claim 1, wherein the response message comprises a successfully accessed response message, the response message carries a time advance of uplink sending timing, and the time advance is obtained based on the first preamble sequence.

9. The method of claim 1, wherein the response message comprises a back-off response message, the response message carries a time advance of uplink sending timing, and the time advance is obtained based on the first preamble sequence; the method further comprises:
adjusting the uplink sending timing based on the time advance;
sending a second random access message to the network device based on an adjusted uplink sending timing, wherein the second random access message carries a third preamble sequence, and the third preamble sequence is generated based on the target mask; and
completing random access based on the second random access message.

10. A random access method, comprising:
receiving a first random access message sent by a spatial terminal, wherein the first random access message carries a first preamble sequence, the first preamble sequence is generated based on a target mask, and the target mask is associated with a height where a spatial terminal is located; and
returning a response message to the spatial terminal.

11. The method of claim 10, wherein the first preamble sequence is obtained by multiplying a second preamble sequence and the target mask.

12. The method of claim 10, wherein masks corresponding to a first height and a second height are mutually orthogonal or mutually quasi-orthogonal.

13. The method of claim 10, wherein a same beam of a network device covers a plurality of stereo cells, of which a first stereo cell and a second stereo cell are located at different heights.

14. The method of claim 13, wherein the method further comprises:
receiving absolute position information sent by the spatial terminal,
determining a stereo cell where the spatial terminal is located based on the absolute position information,
determining a mask corresponding to a height where the stereo cell is located as the target mask; and
sending the target mask to the spatial terminal.

15. The method of claim 10, wherein the method further comprises:
receiving height information sent by the spatial terminal,
determining the target mask based on the height information; and
sending the target mask to the spatial terminal.

16. The method of claim 10, wherein the response message comprises a successfully accessed response message, the response message carries a time advance of uplink sending timing, and the time advance is obtained based on the first preamble sequence.

17. The method of claim 10, wherein the response message comprises a back-off response message, the response message carries a time advance of uplink sending timing, and the time advance is obtained based on the first preamble sequence; the method further comprises:
receiving a second random access message sent by the spatial terminal, wherein the second random access message is sent based on an adjusted uplink sending timing, the uplink sending timing is adjusted based on the time advance, the second random access message carries a third preamble sequence, and the third preamble sequence is generated based on the target mask; and
completing random access based on the second random access message.

18. A spatial terminal, comprising:
one or more processors; and
one or more memories for storing instructions;
wherein the processor is configured to invoke the instructions to enable the spatial terminal to perform a random access method comprising:
sending a first random access message to a network device, wherein the first random access message carries a first preamble sequence, the first preamble sequence is generated based on a target mask, and the target mask is associated with a height where a spatial terminal is located; and
receiving a response message from the network device.

19. A network device, comprising:
one or more processors; and
one or more memories for storing instructions;
wherein the processor is configured to invoke the instructions to enable the network device to perform a random access method comprising:
receiving a first random access message sent by a spatial terminal, wherein the first random access message carries a first preamble sequence, the first preamble sequence is generated based on a target mask, and the target mask is associated with a height where a spatial terminal is located; and
returning a response message to the spatial terminal.

* * * * *